US012586798B2

(12) United States Patent
Mackinnon et al.

(10) Patent No.: US 12,586,798 B2
(45) Date of Patent: Mar. 24, 2026

(54) METHODS AND APPARATUS FOR MOLD MITIGATION IN FUEL CELL HUMIDIFIERS

(71) Applicant: LOOP ENERGY INC., Burnaby (CA)

(72) Inventors: Sean Michael Mackinnon, Gibsons (CA); Matthew Guenther, Vancouver (CA); Claudette Kennette, North Vancouver (CA)

(73) Assignee: Cevizdere LLC, Martinez, CA (US)

( * ) Notice: Subject to any disclaimer, the term of this patent is extended or adjusted under 35 U.S.C. 154(b) by 609 days.

(21) Appl. No.: 17/854,282

(22) Filed: Jun. 30, 2022

(65) Prior Publication Data

US 2023/0006223 A1      Jan. 5, 2023

Related U.S. Application Data

(60) Provisional application No. 63/218,280, filed on Jul. 3, 2021.

(51) Int. Cl.
H01M 8/04119 (2016.01)
H01M 8/04082 (2016.01)
(Continued)

(52) U.S. Cl.
CPC ... H01M 8/04126 (2013.01); H01M 8/04097 (2013.01); H01M 8/04201 (2013.01);
(Continued)

(58) Field of Classification Search
CPC ......... H01M 8/04097; H01M 8/04126; H01M 8/04141; H01M 8/04149; H01M 8/04201; H01M 8/04228; H01M 8/04231; H01M 8/04303; H01M 8/04753; H01M 8/1007; Y02E 60/50
See application file for complete search history.

(56) References Cited

U.S. PATENT DOCUMENTS 4,324,844 A      4/1982  Kothmann
4,407,904 A      10/1983 Uozumi et al.
(Continued)

FOREIGN PATENT DOCUMENTS

AT          407589 B      4/2001
CA          2347199 A1    11/2001
(Continued)

OTHER PUBLICATIONS

Machine translation KR101405689B1 (Year: 2014).*
(Continued)

*Primary Examiner* — Victoria H Lynch
(74) *Attorney, Agent, or Firm* — Cook Alex Ltd.

(57) ABSTRACT

Methods and apparatus for reducing the tendency for mold formation and accumulation in membrane-based humidifiers used in PEM fuel cell systems can include reducing the oxygen concentration and/or generating hydrogen peroxide within the humidifier upon shutdown of a fuel cell system. In some embodiments, a fuel cell system comprises valves and lines located and operable to facilitate introduction of hydrogen into the humidifier upon shutdown of the system. In some embodiments, a fuel cell humidifier comprises a catalyst for promoting the generation of hydrogen peroxide from hydrogen and oxygen, and/or comprises acidic gas transport layers.

20 Claims, 7 Drawing Sheets

(51) Int. Cl.
| | |
|---|---|
| *H01M 8/04089* | (2016.01) |
| *H01M 8/04223* | (2016.01) |
| *H01M 8/04228* | (2016.01) |
| *H01M 8/04303* | (2016.01) |
| *H01M 8/04746* | (2016.01) |
| *H01M 8/1007* | (2016.01) |

(52) U.S. Cl.
CPC ... *H01M 8/04228* (2016.02); *H01M 8/04231*
(2013.01); *H01M 8/04303* (2016.02); *H01M*
*8/04753* (2013.01); *H01M 8/1007* (2016.02)

(56) References Cited

U.S. PATENT DOCUMENTS

| | | | |
|---|---|---|---|
| 4,490,445 | A | 12/1984 | Hsu |
| 4,770,955 | A | 9/1988 | Ruhl |
| 4,910,100 | A | 3/1990 | Nakanishi |
| 4,953,634 | A | 9/1990 | Nelson et al. |
| 5,108,849 | A | 4/1992 | Watkins et al. |
| 5,338,622 | A | 8/1994 | Hsu et al. |
| 5,399,442 | A | 3/1995 | Shundo |
| 5,484,666 | A | 1/1996 | Gibb et al. |
| 5,514,486 | A | 5/1996 | Wilson |
| 5,527,634 | A | 6/1996 | Meacham |
| 5,549,983 | A | 8/1996 | Yamanis |
| 5,589,285 | A | 12/1996 | Cable |
| 5,595,834 | A | 1/1997 | Wilson et al. |
| 5,750,281 | A | 5/1998 | Washington et al. |
| 5,789,091 | A | 8/1998 | Wozniczka et al. |
| 5,851,689 | A | 12/1998 | Chen |
| 6,048,633 | A | 4/2000 | Fujii et al. |
| 6,057,053 | A | 5/2000 | Gibb |
| 6,117,286 | A | 9/2000 | Shimamune et al. |
| 6,159,629 | A | 12/2000 | Gibb et al. |
| 6,161,610 | A | 12/2000 | Azar |
| 6,190,793 | B1 | 2/2001 | Barton et al. |
| 6,234,245 | B1 | 5/2001 | Reid et al. |
| 6,245,453 | B1 | 6/2001 | Wase et al. |
| 6,253,835 | B1 | 7/2001 | Chu et al. |
| 6,258,474 | B1 | 7/2001 | Diethelm et al. |
| 6,291,089 | B1 | 9/2001 | Piaschik et al. |
| 6,337,794 | B1 | 1/2002 | Agonafer et al. |
| 6,344,290 | B1 | 2/2002 | Bossel et al. |
| 6,406,809 | B1 | 6/2002 | Fujii et al. |
| 6,423,437 | B1 | 7/2002 | Kenyon |
| 6,528,196 | B1 | 3/2003 | Fujii et al. |
| 6,551,736 | B1 | 4/2003 | Gurau et al. |
| 6,586,128 | B1 | 7/2003 | Johnson et al. |
| 6,663,992 | B2 | 12/2003 | Lehnert et al. |
| 6,664,693 | B2 | 12/2003 | Leger et al. |
| 6,686,082 | B2 | 2/2004 | Leger et al. |
| 6,689,503 | B2 | 2/2004 | Yang |
| 6,699,614 | B2 | 3/2004 | Rock |
| 6,722,422 | B1 | 4/2004 | Feldmeier |
| 6,729,383 | B1 | 5/2004 | Cannell et al. |
| 6,756,149 | B2 | 6/2004 | Knights et al. |
| 6,773,843 | B2 | 8/2004 | Kitagawa et al. |
| 6,797,425 | B2 | 9/2004 | Blanchet |
| 6,849,353 | B2 | 2/2005 | Vora et al. |
| 6,903,931 | B2 | 6/2005 | McCordic et al. |
| 6,921,598 | B2 | 7/2005 | Yamamoto |
| 7,008,712 | B2 | 3/2006 | Naruse et al. |
| 7,067,213 | B2 | 6/2006 | Boff et al. |
| 7,108,929 | B2 | 9/2006 | Kutrz et al. |
| 7,138,200 | B1 | 11/2006 | Wase et al. |
| 7,285,352 | B2 | 10/2007 | Yoshimoto et al. |
| 7,316,853 | B2 | 1/2008 | Takagi et al. |
| 7,348,094 | B2 | 3/2008 | Thompson et al. |
| 7,399,547 | B2 | 7/2008 | Perry |
| 7,410,714 | B1 | 8/2008 | Burke |
| 7,459,227 | B2 | 12/2008 | Rock et al. |
| 7,517,602 | B2 | 4/2009 | Homma |
| 7,524,575 | B2 | 4/2009 | Bai et al. |
| 7,593,230 | B2 | 9/2009 | Abul-Haj et al. |
| 7,601,452 | B2 | 10/2009 | Goebel |
| 7,615,308 | B2 | 11/2009 | Frederiksen et al. |
| 7,618,734 | B2 | 11/2009 | Rapaport et al. |
| 7,687,183 | B2 | 3/2010 | Lai |
| 7,718,298 | B2 | 5/2010 | Tighe et al. |
| 7,781,087 | B2 | 8/2010 | Rock et al. |
| 7,838,139 | B2 | 11/2010 | Turpin et al. |
| 7,838,169 | B2 | 11/2010 | Montie et al. |
| 7,851,105 | B2 | 12/2010 | Farrington et al. |
| 7,883,813 | B2 | 2/2011 | Lyle et al. |
| 7,935,455 | B2 | 5/2011 | Goebel |
| 8,026,013 | B2 | 9/2011 | Valensa et al. |
| 8,026,020 | B2 | 9/2011 | Spink et al. |
| 8,157,527 | B2 | 4/2012 | Piggush et al. |
| 8,557,462 | B2 | 10/2013 | An et al. |
| 8,679,696 | B2 | 3/2014 | Bogumil et al. |
| 8,883,364 | B2 | 11/2014 | Ko et al. |
| 9,337,498 | B2 | 5/2016 | Suzuki et al. |
| 9,525,184 | B2 | 12/2016 | Kim et al. |
| 9,644,277 | B2 | 5/2017 | MacKinnon et al. |
| 9,761,896 | B2 | 9/2017 | Taruya et al. |
| 9,853,300 | B2 | 12/2017 | Jeong |
| 10,374,238 | B2 | 8/2019 | Sasamoto |
| 2001/0003302 | A1 | 6/2001 | Azar |
| 2001/0003309 | A1 | 6/2001 | Aoyagi et al. |
| 2001/0041281 | A1 | 11/2001 | Wilkinson et al. |
| 2002/0012463 | A1 | 1/2002 | Yamada |
| 2002/0017463 | A1 | 2/2002 | Merida-Donis |
| 2003/0041444 | A1 | 3/2003 | Debe et al. |
| 2003/0059662 | A1 | 3/2003 | Debe et al. |
| 2003/0077501 | A1 | 4/2003 | Knights et al. |
| 2003/0134174 | A1 | 7/2003 | Akikusa et al. |
| 2003/0186106 | A1 | 10/2003 | Frank et al. |
| 2004/0023100 | A1 | 2/2004 | Boff et al. |
| 2004/0067405 | A1 | 4/2004 | Turpin et al. |
| 2004/0099045 | A1 | 5/2004 | Demarest et al. |
| 2004/0101736 | A1 | 5/2004 | Tawfik et al. |
| 2004/0142225 | A1 | 7/2004 | Turpin et al. |
| 2004/0209150 | A1 | 10/2004 | Rock et al. |
| 2005/0026022 | A1 | 2/2005 | Joos |
| 2005/0064263 | A1 | 3/2005 | Goebel et al. |
| 2005/0081552 | A1 | 4/2005 | Nilson et al. |
| 2005/0087326 | A1 | 4/2005 | Barmoav et al. |
| 2005/0112428 | A1 | 5/2005 | Freeman et al. |
| 2005/0115825 | A1 | 6/2005 | Frank et al. |
| 2005/0123821 | A1 | 6/2005 | Al-Quattan et al. |
| 2005/0142425 | A1 | 6/2005 | Homma |
| 2005/0214627 | A1 | 9/2005 | Sugita et al. |
| 2005/0221152 | A1 | 10/2005 | Turpin et al. |
| 2005/0271909 | A1 | 12/2005 | Bai et al. |
| 2006/0093891 | A1 | 5/2006 | Issacci et al. |
| 2006/0154125 | A1 | 7/2006 | Na et al. |
| 2006/0234107 | A1 | 10/2006 | Leger et al. |
| 2006/0257704 | A1 | 11/2006 | Ogino et al. |
| 2007/0009781 | A1 | 1/2007 | Dong |
| 2007/0099062 | A1 | 5/2007 | Leonida |
| 2007/0105000 | A1 | 5/2007 | Chapman et al. |
| 2007/0178359 | A1 | 8/2007 | Peng et al. |
| 2007/0289718 | A1 | 12/2007 | McCordic et al. |
| 2008/0008916 | A1 | 1/2008 | Shin et al. |
| 2008/0066888 | A1 | 3/2008 | Tong et al. |
| 2008/0070080 | A1 | 3/2008 | Miyazaki |
| 2008/0096083 | A1 | 4/2008 | Kuan et al. |
| 2008/0107946 | A1 | 5/2008 | Gunji et al. |
| 2008/0135402 | A1 | 6/2008 | Jupudi et al. |
| 2008/0213648 | A1 | 9/2008 | Montie et al. |
| 2008/0248367 | A1 | 10/2008 | Chou et al. |
| 2008/0248371 | A1 | 10/2008 | Weng et al. |
| 2008/0280177 | A1 | 11/2008 | Ose et al. |
| 2008/0311461 | A1 | 12/2008 | Farrington et al. |
| 2009/0035616 | A1 | 2/2009 | Darling et al. |
| 2009/0053570 | A1 | 2/2009 | Tian et al. |
| 2009/0081516 | A1 | 3/2009 | Watanabe et al. |
| 2009/0145581 | A1 | 6/2009 | Hoffman et al. |
| 2009/0208803 | A1 | 8/2009 | Farrington |
| 2009/0258256 | A1 | 10/2009 | Limbeck et al. |
| 2010/0119909 | A1 | 5/2010 | McElroy et al. |
| 2010/0178581 | A1 | 7/2010 | An et al. |
| 2010/0190087 | A1 | 7/2010 | Yoshida et al. |
| 2010/0203399 | A1 | 8/2010 | Poshusta et al. |

(56) References Cited

U.S. PATENT DOCUMENTS

| | | | | |
|---|---|---|---|---|
| 2010/0216044 A1 | 8/2010 | Hawkins et al. | | |
| 2010/0248044 A1* | 9/2010 | Thampan | ......... | H01M 8/04225 |
| | | | | 429/513 |
| 2010/0279189 A1 | 11/2010 | Wang et al. | | |
| 2011/0003222 A1 | 1/2011 | Margiott et al. | | |
| 2011/0076585 A1 | 3/2011 | Edmonston et al. | | |
| 2011/0079370 A1 | 4/2011 | Wen et al. | | |
| 2011/0097648 A1 | 4/2011 | Blank | | |
| 2011/0159396 A1 | 6/2011 | Kleemann et al. | | |
| 2011/0171023 A1 | 7/2011 | Lee et al. | | |
| 2011/0171551 A1 | 7/2011 | Burmeister et al. | | |
| 2011/0177417 A1 | 7/2011 | Wolk et al. | | |
| 2011/0223507 A1 | 9/2011 | LaVen et al. | | |
| 2011/0223508 A1 | 9/2011 | Arnold | | |
| 2011/0232885 A1 | 9/2011 | Kaslusky et al. | | |
| 2011/0262826 A1 | 10/2011 | Dadheech et al. | | |
| 2011/0269037 A1 | 11/2011 | Burmeister et al. | | |
| 2012/0040260 A1 | 2/2012 | Morita et al. | | |
| 2012/0040268 A1 | 2/2012 | Okanishi et al. | | |
| 2012/0107714 A1 | 5/2012 | Day et al. | | |
| 2012/0308911 A1 | 12/2012 | Peled | | |
| 2013/0149625 A1 | 6/2013 | Ikeya | | |
| 2013/0252116 A1 | 9/2013 | Zhang et al. | | |
| 2014/0193738 A1 | 7/2014 | Rouillon et al. | | |
| 2014/0329164 A1 | 11/2014 | Utsunomiya et al. | | |
| 2015/0037704 A1 | 2/2015 | Iritsuki et al. | | |
| 2015/0072258 A1 | 3/2015 | Naito | | |
| 2015/0093674 A1 | 4/2015 | Ikoma | | |
| 2015/0180052 A1 | 6/2015 | Leger et al. | | |
| 2015/0180079 A1 | 6/2015 | Leger et al. | | |
| 2015/0349353 A1 | 12/2015 | Hood et al. | | |
| 2016/0190620 A1 | 6/2016 | Kwon et al. | | |
| 2017/0077531 A1 | 3/2017 | Kim et al. | | |
| 2017/0117561 A1 | 4/2017 | Wakabayashi et al. | | |
| 2017/0279131 A1 | 9/2017 | Poirot-Crouvezier | | |
| 2018/0159159 A1* | 6/2018 | Jung | ................... | B62D 35/007 |
| 2018/0339080 A1 | 11/2018 | Tak | | |
| 2019/0140289 A1 | 5/2019 | Leger et al. | | |
| 2019/0319279 A1 | 10/2019 | Kunz et al. | | |
| 2021/0135242 A1* | 5/2021 | Kim | ................... | H01M 4/9058 |
| 2023/0006223 A1 | 1/2023 | Mackinnon et al. | | |

FOREIGN PATENT DOCUMENTS

| | | | | | |
|---|---|---|---|---|---|
| CA | 2437891 A1 | 8/2002 | | | |
| CA | 2437892 | 8/2002 | | | |
| CA | 2441087 | 10/2002 | | | |
| CA | 2456731 | 8/2004 | | | |
| CA | 2594365 A1 | 7/2006 | | | |
| CA | 2880560 A1 | 7/2006 | | | |
| CA | 2653148 A1 | 8/2009 | | | |
| CA | 2787467 | 7/2011 | | | |
| CA | 2925051 A1 | 4/2014 | | | |
| CA | 3016102 A1 | 9/2017 | | | |
| CA | 3019139 A1 | 10/2017 | | | |
| CA | 3068413 A1 | 1/2019 | | | |
| CN | 1491446 | 4/2004 | | | |
| CN | 1663067 | 8/2005 | | | |
| CN | 101099253 A | 1/2008 | | | |
| CN | 101253645 A | 8/2008 | | | |
| CN | 102035002 A | 4/2011 | | | |
| CN | 102089911 A | 6/2011 | | | |
| CN | 102623730 A | 8/2012 | | | |
| CN | 104718651 A | 6/2015 | | | |
| DE | 10054444 A1 | 10/2007 | | | |
| EP | 0207799 A2 | 1/1987 | | | |
| EP | 0355420 B1 | 10/1993 | | | |
| EP | 0616380 A1 | 9/1994 | | | |
| EP | 0694216 B1 | 1/1996 | | | |
| EP | 1496558 | 1/2005 | | | |
| EP | 1410455 B1 | 8/2006 | | | |
| EP | 1756899 A1 | 2/2007 | | | |
| EP | 1512192 B1 | 5/2008 | | | |
| EP | 2113731 A1 | 11/2009 | | | |
| EP | 1756899 B1 | 8/2011 | | | |
| EP | 2826092 B1 | 1/2015 | | | |
| EP | 3678243 A1 | 7/2020 | | | |
| EP | 3790088 A1 | 3/2021 | | | |
| JP | 861256568 A | 11/1986 | | | |
| JP | H3276569 A | 12/1991 | | | |
| JP | H4370664 A | 12/1992 | | | |
| JP | 16267564 A | 9/1994 | | | |
| JP | H9050817 A | 2/1997 | | | |
| JP | H11016590 A | 1/1999 | | | |
| JP | H132001006717 A | 1/2001 | | | |
| JP | H132001291522 A | 10/2001 | | | |
| JP | H152003092121 | 3/2003 | | | |
| JP | H172005268110 | 9/2005 | | | |
| JP | H172005536033 A | 11/2005 | | | |
| JP | H182006318863 A | 11/2006 | | | |
| JP | H202008010179 A | 1/2008 | | | |
| JP | H202008502112 A | 1/2008 | | | |
| JP | H202008081761 A | 4/2008 | | | |
| JP | H202008103168 A | 5/2008 | | | |
| JP | H202008108571 A | 5/2008 | | | |
| JP | H212009081061 A | 4/2009 | | | |
| JP | H222010243102 A | 10/2010 | | | |
| JP | H245029813 B2 | 9/2012 | | | |
| JP | H242012237068 A | 12/2012 | | | |
| JP | H292017152174 A | 8/2017 | | | |
| KR | 0-2006-0059461 A | 6/2006 | | | |
| KR | 101405689 B1 * | 6/2014 | ........ | H01M 8/04149 |
| KR | 20160144636 A | 12/2016 | | | |
| WO | 2000026981 A1 | 5/2000 | | | |
| WO | 2002065565 | 8/2002 | | | |
| WO | 2002065566 A1 | 8/2002 | | | |
| WO | 2002089244 | 11/2002 | | | |
| WO | 2004114446 | 12/2004 | | | |
| WO | 2006120027 A1 | 11/2006 | | | |
| WO | 2011028389 A2 | 3/2011 | | | |
| WO | 2014026287 A1 | 2/2014 | | | |
| WO | 2014056110 A1 | 4/2014 | | | |
| WO | 2017161449 A1 | 9/2017 | | | |
| WO | 2019046108 A2 | 3/2019 | | | |
| WO | 2022094717 A1 | 5/2022 | | | |
| WO | WO 2022213214 A1 | 10/2022 | | | |
| WO | 2023044562 A1 | 3/2023 | | | |

OTHER PUBLICATIONS

Lee et al. "The Effects of Compression and Gas Diffusion Layers on the Performance of a PEM Fuel Cell", J. of Power Sources, 84, 1999, pp. 45-51.

Mikkola et al. "Modeling the Internal Pressure Distribution of a Fuel Cell", New Energy Technologies Group Department of Applied Physics, Helsinki University of Technology, 2009.

Montanini et al., "Experimental Evaluation of the Clamping Pressure Distribution in a PEM Fuel Cell Using Matrix-Based Piezoresistive Thin-Film Sensors", Fundamental and Applied Metrology., 2009, pp. 2039-2044.

Ghosh et al. "Influences of Contact Pressure on the Performances of Polymer Electrolyte Fuel Cells", J. of Energy, vol. 2013, pp. 1-11.

Muthukumar et al. "Numerical Studies on PEM Fuel Cell with Different Landing to Channel Width of Flow Channel", Procedia Engineering, 97, 2014, pp. 1534-1542.

De La Cruz et al. "Simulation and in Situ Measurement of Stress Distribution in a Polymer Electrolyte Membrane Fuel Cell Stack", J. of Power Sources, 329, 2016, pp. 273-280.

Alizadeh et al. "Investigation of Contact Pressure Distribution Over the Active Area of PEM Fuel Cell Stack", International Journal of Hydrogen Energy, vol. 41, Issue 4, (2016), pp. 3062-3071.

Simon et al. "Influence of the Gas Diffusion Layer Compression on the Oxygen Transport in PEM Fuel Cells at High Water Saturation Levels", J. of the Electrochemical Society, 164 (6), 2017, pp. F591-F599.

Chowdhury et al., "Numerical Optimization of Channel to Land Width Ratio for PEM Fuel Cell", Int. J. of Hydrogen Energy, 43, 2018, pp. 10798-10809.

Randrianarizafy et al. "Design Optimization of Rib/Channel Patterns in a PEMFC through Performance Heterogeneities Model-

(56) References Cited

OTHER PUBLICATIONS ling", International J. of Hydrogen Energy 43, 2018, pp. 8907-8926.

Kulkarni et al. "The Effect of Non-Uniform Compression and Flow-Field Arrangements on Membrane Electrode Assemblies—X-ray Computed Tomography Characterisation and Effective Parameter Determination", Journal of Power Sources, vol. 426, 2019, pp. 97-110.

Dey et al. "Study of PEM Fuel Cell End Plate Design by Structural Analysis Based on Contact Pressure", J.of Energy, Jan. 2, 2019, pp. 1-11.

Zhang et al. "Experimental Studies of Effect of Land Width in PEM Fuel Cells with Serpentine Flow Field and Carbon Cloth", Energies 12, 471, Feb. 1, 2019, pp. 1-10.

Qiu et al. "An Intelligent Approach for Contact Pressure Optimization of PEM Fuel Cell Gas Diffusion Layers", Applied Sciences, Issue 10, vol. 4194, 2020, pp. 1-14.

Office Action issued in connection with Canadian App. No. 3,016,102 on Jun. 15, 2023.

Claiborne, H.C., "Heat Transfer In Non-Circular Ducts", Oak Ridge National Laboratory operated by Carbide and Carbon Chemicals Co., 1951, pp. 1-43.

Montgomery, S.R. et al., "Laminar Flow Heat Transfer for Simultaneously Developing Velocity and Temperature Profiles in Ducts of Rectangular Cross Section", Appl. Sci. Res., vol. 18, 1967, pp. 247-259.

Barrow, H. et al., "The Effect of Velocity Distribution on Forced Convection Laminar Flow Heat Transfer in a Pipe at Constant Wall Temperature", Warme und Stoffubertragung, Bd. 3, 1970, pp. 227-231.

Biber, C. R., "Pressure Drop and Heat Transfer in an Isothermal Channel with Impinging Flow", IEEE Transactions on Components, Packaging, and Manufacturing Technology Part A, vol. 20(4), 1997, pp. 458-462.

Soule, C. A., "Future Trends in Heat Sink Design", https://www.electronics-cooling.com/2001/02/future-trends-in-heat-sink-design/, 2001, accessed Dec. 6, 2018.

Banker, R., et al., "Experimental and Computational Investigation of the Hydrodynamics and Heat Transfer in a Flat Channel of Variable Width for Smooth and Intensified Surfaces", Heat Transfer Research, vol. 35, 2004, pp. 1-10.

Sammes, N., ed. Fuel cell technology: reaching towards commercialization. Springer Science & Business Media (2006).

Choudhary, V, et al., "Decomposition and/or Hydrogenation of Hydrogen Peroxide Over Pd/Al2O2 Catalyst in Aqueous Medium: Factors Affecting the Rate of H2O2 Destruction in Presence of Hydrogen", Applied Catalysis A: General 332, 2007, pp. 70-78.

Samanta, C, "Direct Synthesis of Hydrogen Peroxide from Hydrogen and Oxygen: An Overview of Recent Developments in the Process", Applied Catalysis A: General 350, 2008, pp. 133-149.

Marangio et al., "Theoretical Model and Experimental Analysis of a High Pressure PEM water Electrolyser for Hydrogen Production", International Journal of Hydrogen Energy, 2009, vol. 34, pp. 1143-1158.

Brodmann, et al., "Modular Fuel Cell System", 18th World Hydrogen Energy Conference 2010, pp. 137-140.

Hydrogenics, "HyPM Fuel Cell Power Modules", Mar. 2010.

Remick, "Reversible Fuel Cells Workshop Summary Report", U.S. Department of Energy, 2011, pp. 1-150.

Hiwang et al., "Flow Field Design for a Polymer Electrolyte Unitized Reversible Fuel Cell", Honolulu PRiME, 2012, Abstract #1405.

Hydrogenics, "HyPM-HD Power Modules for light and heavy duty mobility", 2012.

Koz, M. et al., "A Preliminary Study for 3D Numerical Simulation of a Throughplane Temperature Profile in a PEMFC Incorporating Coolant Channels", Proceedings of the ASME 2012 10th International Conference on Nanochemicals, Microchannels, and Minichannels, ICNNM12, Jul. 8-12, 2012, Rio Grande, Puerto Rico, pp. 1-10.

Bonghwan et al., "Dynamic Simulation of PEM Water Electrolysis and Comparison with Experiments", Int. J. Electrochem. Sci., 2013, vol. 8, pp. 235-248.

Kuan, et al., "Heat-Transfer Analysis of a Water-Cooled Channel For the TPS Front-End Components", THPF1072, Proceedings of IPAC2013, Shanghai, China, 2013, pp. 3466-3468.

Hydrogenics, "Hydrogenics Marine Applications: Electrolysers and Fuel Cell Power Modules", Apr. 2013.

International Search Report and Written Opinion dated Sep. 24, 2013 in connection with International Application No. PCT/CA2013/050626.

International Search Report dated Nov. 13, 2013 in connection with International Application No. PCT/ CA2013/050627.

International Search Report dated Nov. 15, 2013 in connection with International Application No. PCT/ CA2013/050769.

International Preliminary Report on Patentability dated Feb. 26, 2015 in connection with International Application No. PCT/CA2013/050626.

International Preliminary Report dated Feb. 26, 2015 in connection with International Application No. PCT/ CA2013/050627.

International Preliminary Report on Patentability dated Apr. 23, 2015 in connection with International Application No. PCT/CA2013/050769.

Office Action dated Oct. 10, 2016 in connection with Chinese Patent Application No. 201380064598.4.

Office Action dated Oct. 17, 2016 in connection with Chinese Patent Application No. 201380053699.1.

International Search Report and Written Opinion dated Jun. 15, 2017 in connection with International Application No. PCT/CA2017/050358.

Sun, K, et al. "Vehicle Emissions as an Important Urban Ammonia Source in the United States and China", Environ. Sci. Technol. 51, 2017, pp. 2472-2481.

Gomez, Y, et al., "Ammonia Contamination of a Proton Exchange Membrane Fuel Cell", J. of the Electrochem. Soc., 165, 2018, pp. F189-F197.

International Preliminary Report on Patentability dated Jun. 27, 2018 in connection with International Application No. PCT/CA2017/050358.

Examination Report issued in connection with Canadian App. No 2,919,875 on Jun. 10, 2019.

Examination Report issued in connection with Canadian App. No. 2,925,051 on Aug. 6, 2019.

The Extended European Search Report issued by the European Patent Office on Oct. 18, 2019 in connection with European patent application No. 17769212.6.

Office Action issued in connection with CA App. No. 2,919,875 on Feb. 7, 2020.

Examination Report issued in connection with UK App. No. GB1503750.0 on Feb. 24, 2020.

1st Office Action issued in connection with Chinese App. No. 201710699586.9 on Feb. 25, 2020.

1st Office Action issued in connection with Chinese App. No. 201710699589.2 on Mar. 3, 2020.

Examination Report issued in connection with UK App. No. GB1503751.8 on Mar. 18, 2020.

1st Office Action issued in connection with Chinese App. No. 201711004994.4 on Mar. 24, 2020.

Office Action issued in connection with Canadian App. No. 2,925,051 on Apr. 30, 2020.

Examination Report issued in connection with UK App. No. GB1507832.2 on Jun. 30, 2020.

Examination Report issued in connection with Canadian App. No 2,919,875 on Aug. 14, 2020.

Examination Report issued in connection with Indian App. No. 201837035491 on Aug. 14, 2020.

Examination Report issued in connection with UK App. No. GB1503751.8 on Sep. 1, 2020.

Notice of Allowance issued in connection with CN App. No. 201710699586.9 on Sep. 4, 2020.

2nd Office Action issued in connection with Chinese App. No. 201711004994.4 on Dec. 22, 2020.

(56)    References Cited

OTHER PUBLICATIONS

1st Office Action issued in connection with Chinese App. No. 201780018272.6 on Dec. 29, 2020.
Examination Report issued in connection with Japanese App. No. 2018549209 on Mar. 5, 2021.
Examination Report issued in connection with European App. No. 17759212.6 on Apr. 26, 2021.
International Search Report dated Jan. 27, 2022, in connection with International Application No. PCT/CA2021/051575.
Office Action dated Apr. 29, 2022, issued in connection with Canadian Application No. 3,123,208.
International Search Report dated Jul. 11, 2022, in connection with International Application No. PCT/CA2022/050549.
International Preliminary Report on Patentability dated Oct. 19, 2023, in connection with International Application No. PCT/CA2022/050549.
Office Action issued in connection with Canadian App. No. 3,123,208 on Dec. 16, 2022.
International Search Report and Written Opinion dated Dec. 22, 2022, in connection with International Application No. PCT/CA2022/051394.
Extended European Search Report dated May 12, 2025, issued in connection with European Application No. 22783750.7.
Extended European Search Report dated May 21, 2025, issued in connection with European Application No. 21887960.9.
Haile, S.M. "Fuel Cell Materials and Components", Acta Materalia, vol. 51, 2003, pp. 5981-6000.

* cited by examiner

ON state

OFF state

METHODS AND APPARATUS FOR MOLD MITIGATION IN FUEL CELL HUMIDIFIERS

CROSS-REFERENCE TO RELATED APPLICATION(S)

This application is related to and claims priority benefits from U.S. Provisional Patent Application Ser. No. 63/218,280 having a filing date of Jul. 3, 2021, entitled "Methods and Apparatus for Mold Mitigation in Fuel Cell Humidifiers". The '280 application is hereby incorporated by reference herein in its entirety.

FIELD OF THE INVENTION

The present invention relates generally to humidifiers for Proton-exchange membrane (PEM) fuel cells and, more specifically, to methods and apparatus for reducing the tendency for mold formation and accumulation in such humidifiers.

Fuel cells convert fuel and oxidant to electricity and reaction product. PEM fuel cells (also known as polymer electrolyte membrane fuel cells or solid polymer fuel cells) employ an ion exchange membrane as the electrolyte. Such fuel cells often comprise a membrane electrode assembly ("MEA") consisting of a membrane electrolyte disposed between two porous, electrically conductive electrodes, with each electrode comprising a suitable catalyst disposed at the membrane/electrode interface to induce the desired electrochemical reactions.

Fuel is supplied to the anode and oxidant to the cathode. In fuel cells employing hydrogen as the fuel and oxygen-containing air (or substantially pure oxygen) as the oxidant, the anode reaction produces hydrogen ions (protons) from the fuel supply. The ion exchange membrane electrolyte facilitates the migration of protons from the anode to the cathode. In addition to conducting protons, the membrane isolates the hydrogen-containing fuel stream from the oxygen-containing oxidant stream. At the cathode, oxygen reacts with protons that have crossed the membrane and electrons to form liquid water as the reaction product. The anode and cathode reactions in hydrogen/oxygen fuel cells are shown in the following equations:

$$H_2 \rightarrow 2H^+ + 2e^- \qquad \text{Anode reaction:}$$

$$\tfrac{1}{2}O_2 + 2H^+ + 2e^- \rightarrow H_2O \qquad \text{Cathode reaction:}$$

In conventional fuel cells, the MEA is disposed between two electrically conductive flow field plates via which the fuel and oxidant are directed to the respective electrodes, namely, the anode on the fuel side and the cathode on the oxidant side. The plates act as current collectors, provide support for the electrodes, provide access channels for the fuel and oxidant to the respective anode and cathode surfaces, and provide channels for the removal of water formed during operation of the cell. Two or more fuel cells can be connected electrically, generally in series but sometimes in parallel, to increase the overall power output of the assembly. In series arrangements, one side of a given plate can serve as an anode plate for one cell and the other side of the plate can serve as the cathode plate for the adjacent cell. Such a series connected multiple fuel cell arrangement is referred to as a fuel cell stack. The stack typically includes manifolds and inlet ports for directing the fuel and the oxidant to the anode and cathode flow field channels. The stack also usually includes a manifold and inlet port for directing the coolant fluid, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for coolant exiting the stack.

Most ion-exchange membranes that are typically used as electrolytes in PEM fuel cells are hydrated, or saturated with water molecules, in order for adequate proton transport to occur. For example, it is generally accepted that perfluorosulfonic acid (PFSA) membranes transport protons via a "water pumping" phenomenon. Water pumping involves the transport of protons in conjunction with water molecules, thus proton conductivity through ion exchange membranes often requires the presence of water molecules in the membrane. Adequate membrane humidification of the membrane electrolyte during fuel cell operation can be achieved by humidification of the oxygen-containing oxidant stream prior to supplying it to the fuel cell cathode(s). Sometimes the fuel stream is also humidified prior to supplying it to the fuel cell anode(s).

In some cases, the fuel and/or oxidant gases are humidified by flowing the respective gas on one side of a water exchange membrane and by flowing deionized water on the opposite side of the membrane. Use of deionized water can reduce or prevent membrane contamination by undesired ions from the water used for humidification. In such membrane-based humidification arrangements, water is transferred across the membrane to the fuel and/or oxidant gas. Nafion® (which is also used as a membrane electrolyte in PEM fuel cells) is a suitable and convenient perfluorosulfonic-acid-based humidification membrane in fuel cell humidifiers, but other commercially available water exchange membranes can be used for this purpose. Alternatively, other non-membrane-based humidification techniques can be employed, such as exposing the reactant gas directly to water in an evaporation chamber to permit the gas to absorb water vapor, or passing the gas through a water bubbler.

In some PEM fuel cell humidifiers the warm, moist exhaust stream from the cathode is used to humidify the incoming oxidant (e.g. air) stream, by flowing the streams on opposite sides of a water transfer membrane in a humidifier, the water transfer membrane allowing water from the cathode exhaust stream to pass through the membrane (for example, as liquid and/or as vapor) and humidify the incoming oxidant stream. The humidifier can be a separate device positioned upstream of a fuel cell stack, or can be integrated into a fuel cell stack (e.g. between the stack end-plates, along with the stacked fuel cell assemblies)

The high efficiency of PFSA-based membranes for proton transport in PEM fuel cells can be compromised through absorption into the membrane of break-through "contaminants" that can neutralize the acidity of the acidic PFSA-based membrane. In general, there are at least two types of contaminants that tend to neutralize acidic membranes, namely ionic and alkaline contaminants. Ionic contaminants, such as sodium chloride (e.g. arising in applications in coastal locations) can neutralize PFSA-based membranes to produce a sodium sulfonate salt, and dramatically reduce the solvation rate of water in the membrane. Alkaline compounds, such as ammonia, a non-ionic weak base, can convert sulfonic acidic functional groups in an acidic membrane into ammonium sulfate, and significantly reduce the solvation of water, for example, by 2-3 times. These contaminants are known to reduce performance of PFSA-based membranes as electrolytes in PEM fuel cells, although in some cases subsequent performance recovery can occur as a result of electrochemical reactions with hydrogen, oxygen, and platinum.

Water transfer rates in fuel cell humidifiers with PFSA-based membranes are more susceptible to both ionic and alkaline contaminants based on a reduced number of total moles of acid present in a water transfer membrane-based humidifier (based on the area of membrane in a fuel cell stack relative to the area of membrane in a humidifier for a fuel cell stack), and the inability of the humidifier to benefit from any electrochemical-based cleaning or regeneration of the membrane. For example, for a fuel cell stack containing approximately 6-11 square meters of an 18-micron thick PFSA-based membrane such as Nafion® (which yields a range of 0.3-0.6 moles of sulfonic acid per stack), a suitable humidifier with a PFSA-based water transfer membrane may incorporate only 2 square meters of a 5-micron thick membrane. In this case the humidifier would have approximately 15-30 times less sulfonic acid groups than the fuel cell stack, resulting in the humidifier having greater susceptibility to ionic or alkaline contamination than the fuel cell stack. Predicting the lifetime of a water transfer membrane-based humidifier is difficult as it is based on a number of factors, such as but not limited to, (i) the concentration of contaminants in the local air, and other sources of contaminants within the system, e.g. leaching from components etc., (ii) the efficiency and effectiveness of filtration through an intake air filter, and (iii) the rate of absorption of contaminants by the PFSA-based membrane in a water transfer membrane-based humidifier, to name a few.

In addition to contamination, PFSA-based membranes can also undergo self-condensation reactions leading to the formation of sulfono-anhydrides, which can also reduce water transfer rates through the membrane.

There are two main approaches that have been used to address the degradation mechanisms of PFSA-based water transfer membranes, namely, (i) the use of neutral hygroscopic materials, or (ii) use of low-water-content polymers (e.g. polytetrafluoroethylene (PTFE) or hydrocarbon polymers) that have been converted into microporous films or into hollow-tubes that rely on capillary action to condense water while water vapor is passing through capillary tubes within the hollow fiber membranes, and then allow evaporation of water to provide water vapor to a drier stream. These approaches can help address the problems of membrane contamination via ionic and alkaline compounds, while also addressing degradation associated with the formation of sulfono-anhydrides, and accumulation of mechanical stress associated with hydration-dehydration cycles.

There can be a tendency for mold to form in the moist, dark, and sometimes warm conditions inside a membrane-based humidifier. PFSA-based water transfer membranes are usually somewhat resistant to mold formation due to their inherent acidity which reduces the tendency for bacteria to grow on or near the membrane, however they can suffer from other degradation mechanisms that adversely affect their performance as discussed above. Humidifiers that use non-acidic water transfer membranes are typically more susceptible to problems with mold. Mold can accumulate on the surface of the membrane and impede water access to the membrane surface and transport of water across the membrane from one gas stream to the other. Filters can be used to filter the gas stream(s) entering the humidifier, but such filters are generally not 100% effective. This can lead to breakthrough of bacteria which can cause porous layers adjacent to the water transfer membrane to become obstructed and/or cause the surface of the membrane to be fouled with mold.

SUMMARY OF THE INVENTION

In some embodiments of a method of operating a fuel cell system, the fuel cell system comprises a humidifier and a fuel cell stack. In some embodiments the humidifier has a dry-side compartment and a wet-side compartment. In some embodiments the dry-side compartment is separated from the wet-side compartment by a water transfer membrane. In some embodiments the fuel cell stack comprises an anode compartment and a cathode compartment. In some embodiments the anode compartment is separated from the cathode compartment by a proton-exchange membrane. In some embodiments, in an electrical power-producing mode of operation, the method comprises supplying hydrogen to the anode compartment of the fuel cell stack, supplying air to the cathode compartment of the fuel cell stack via the dry-side compartment of the humidifier, discharging oxygen-depleted air from the cathode compartment of the fuel cell stack, and directing it through the wet-side compartment of the humidifier, and drawing electrical power from the fuel cell stack. In some embodiments air supplied to the cathode compartment of the fuel cell stack is humidified by the oxygen-depleted air discharged from the cathode compartment of the fuel cell stack. In some embodiments in a shutdown mode, the method comprises interrupting supplying hydrogen to the anode compartment of the fuel cell stack, interrupting supplying air to the cathode compartment of the fuel cell stack, and allowing hydrogen to diffuse from the anode compartment to the cathode compartment of the fuel cell stack via the proton-exchange membrane, and from the cathode compartment of the fuel cell stack to the dry-side compartment of the humidifier and to the wet-side compartment of the humidifier, whereby at least a portion of the diffused hydrogen reacts to consume oxygen in the cathode compartment of the fuel cell stack.

In some embodiments, interrupting supplying air to the cathode compartment of the fuel cell stack can comprise closing a first valve positioned upstream of the dry-side compartment of the humidifier.

In some embodiments, allowing hydrogen to diffuse from the anode compartment to the cathode compartment of the fuel cell stack via the proton-exchange membrane, and from the cathode compartment of the fuel cell stack to the dry-side compartment and to the wet-side compartment of the humidifier, can comprise closing a second valve positioned downstream of the wet-side compartment of the humidifier.

In some embodiments at least one of the dry-side compartment or the wet-side compartment of the humidifier comprises a catalyst for promoting formation of hydrogen peroxide from oxygen and hydrogen during the shutdown mode.

In some embodiments, at least a portion of the diffused hydrogen reacts to consume oxygen in the dry-side and the wet-side compartments of the humidifier.

In some embodiments, interrupting supplying air to the cathode compartment of the fuel cell stack is performed prior to the interrupting supplying fuel to the anode compartment of the fuel cell stack.

In some embodiments, supplying hydrogen to the anode compartment of the fuel cell stack comprises supplying hydrogen to the anode compartment of the fuel cell stack from a hydrogen supply via a fuel recirculation loop. In some embodiments, in the shutdown mode, the method can comprise providing a fluid connection between the fuel recirculation loop and at least one of the dry-side compartment or the wet-side compartment of the humidifier. In some embodiments, providing this fluid connection can comprise opening a valve between the fuel recirculation loop and the humidifier. Alternatively, or in addition, in the shutdown mode the method can comprise providing hydrogen from the fuel supply to at least one of the dry-side compartment or the wet-side compartment of the humidifier. In some embodiments, the hydrogen can be supplied from the fuel supply to at least one of the dry-side compartment or the wet-side compartment of the humidifier via a line that bypasses the fuel cell stack.

In some embodiments, the fuel cell system comprises an oxidant supply device, a humidifier, and a fuel cell stack. In some embodiments, the humidifier has a dry-side compartment and a wet-side compartment. In some embodiments, the dry-side compartment and the wet-side compartment are separated by a water transfer membrane. In some embodiments, the fuel cell stack comprises an anode compartment and a cathode compartment. In some embodiments, the anode compartment separated from the cathode compartment by a proton-exchange membrane.

In some embodiments, the fuel cell system can further include: a first air supply line between the oxidant supply device and the dry-side compartment of the humidifier; a second air supply line between the dry-side compartment of the humidifier and an oxidant inlet of the fuel cell stack; a first exhaust line connected between an oxidant outlet of the fuel cell stack and the wet-side compartment of the humidifier; a second exhaust line for discharging an exhaust stream from the wet-side compartment of the humidifier; a first valve installed in the first air supply line, the first valve for selectively opening and closing the first air supply line; and/or a second valve installed in the second exhaust line, the second valve for selectively opening and closing the second exhaust line In some embodiments, in an electrical power-producing mode of operation, the method comprises: supplying hydrogen to the anode compartment of the fuel cell stack; with the first valve open, supplying air from the oxidant supply device to the cathode compartment of the fuel cell stack via the dry-side compartment of the humidifier; with the second valve open, discharging oxygen-depleted air from the cathode compartment of the fuel cell stack, and directing it to flow through the wet-side compartment of the humidifier, whereby the air supplied to the cathode compartment of the fuel cell stack is humidified by the oxygen-depleted air discharged from the cathode compartment of the fuel cell stack; and/or drawing electrical power from the fuel cell stack.

In some embodiments, in a shutdown mode, the method comprises: closing the first valve and interrupting supplying air from the oxidant supply device to the cathode compartment of the fuel cell stack; closing the second valve; interrupting supplying hydrogen to the anode compartment of the fuel cell stack; and/or allowing hydrogen to diffuse from the anode compartment to the cathode compartment of the fuel cell stack via the proton-exchange membrane, and from the cathode compartment of the fuel cell stack to the dry-side compartment of the humidifier and to the wet-side compartment of the humidifier, whereby the diffused hydrogen reacts to consume oxygen in the cathode compartment of the fuel cell stack and in the dry-side and set-side compartments of the humidifier.

In some embodiments of a fuel cell system, the system comprises a fuel cell stack, an oxidant supply device for supplying air to the fuel cell stack, and a humidifier for humidifying air supplied by the oxidant supply device to the fuel cell stack. In some embodiments, the humidifier has a dry-side compartment and a wet-side compartment. In some embodiments, the dry-side compartment and the wet-side compartment are separated by a water transfer membrane.

In some embodiments, the fuel cell system further comprises: a first air supply line between the oxidant supply device and the dry-side compartment of the humidifier; a second air supply line between the dry-side compartment of the humidifier and an oxidant inlet of the fuel cell stack, for directing humidified air from the humidifier to the fuel cell stack; a first exhaust line connected between an oxidant outlet of the fuel cell stack and the wet-side compartment of the humidifier, for supplying an oxidant exhaust gas discharged from the fuel cell stack to the wet-side compartment of the humidifier to humidify air supplied by the oxidant supply device to the fuel cell stack; a second exhaust line for discharging an exhaust stream from the wet-side compartment of the humidifier; a first valve installed in the first air supply line, the first valve for selectively opening and closing the first air supply line; and/or a second valve installed in the second exhaust line the second valve for selectively opening and closing the second exhaust line.

In some embodiments, the humidifier comprises a catalyst for promoting formation of hydrogen peroxide from hydrogen and oxygen. In some embodiments, the catalyst can be a palladium-based catalyst. In some embodiments the catalyst is located on both the wet-side compartment and the dry-side compartment of the humidifier. In some embodiments the catalyst is deposited on a gas transport layer positioned adjacent the water transfer membrane on the wet-side compartment and/or on the dry-side compartment of the humidifier.

In some embodiments, the humidifier comprises an acidic gas transport layer positioned adjacent at least one side of the water transfer membrane material. In some embodiments, the water transfer membrane is sandwiched between a pair of acidic gas transport layers. In some embodiments, the humidifier comprises a catalyst for promoting formation of hydrogen peroxide from hydrogen and oxygen.

In some embodiments, the system comprises a fuel supply device and a fuel recirculation loop for circulating a fuel through the fuel cell stack, and a fuel bleed line fluidly connecting the fuel recirculation loop to the first exhaust line. In some embodiments, the bleed line can comprise a purge valve for selectively bleeding fuel from the fuel recirculation loop into the wet-side compartment of the humidifier via the first exhaust line.

In some embodiments, the system comprises a fuel supply device and a fuel recirculation loop for circulating a fuel through the fuel cell stack, and a fuel bypass line fluidly connecting at least one of the wet-side compartment or the dry-side compartment of the humidifier to the fuel supply. In some embodiments, the fuel line can comprise a valve for controlling supply of fuel from the fuel supply to the humidifier.

In some embodiments, the system comprises a fuel cell stack, an oxidant supply device for supplying air to the fuel cell stack, and a humidifier for humidifying air supplied by the oxidant supply device to the fuel cell stack. In some embodiments, the humidifier has a dry-side compartment and a wet-side compartment. In some embodiments, the dry-side compartment and the wet-side compartment are separated by a water transfer membrane.

In some embodiments, the humidifier comprises a catalyst for promoting formation of hydrogen peroxide from hydrogen and oxygen within the humidifier, and/or the humidifier comprises an acidic gas transport layer positioned adjacent at least one side of the water transfer membrane. In some embodiments, the catalyst can be a palladium-based catalyst. In some embodiments the catalyst is located on both the wet-side compartment and the dry-side compartment of the humidifier. In some embodiments the catalyst is deposited on a gas transport layer positioned adjacent the water transfer membrane on the wet-side compartment and/or on the dry-side compartment of the humidifier. In some embodiments, the water transfer membrane is sandwiched between a pair of acidic gas transport layers.

In some embodiments, the fuel cell system further comprises: a first air supply line between the oxidant supply device and the dry-side compartment of the humidifier; a second air supply line between the dry-side compartment of the humidifier and an oxidant inlet of the fuel cell stack, for directing humidified air from the humidifier to the fuel cell stack; a first exhaust line connected between an oxidant outlet of the fuel cell stack and the wet-side compartment of the humidifier, for supplying an oxidant exhaust gas discharged from the fuel cell stack to the wet-side compartment of the humidifier to humidify air supplied by the oxidant supply device to the fuel cell stack; and/or a second exhaust line for discharging an exhaust stream from the wet-side compartment of the humidifier.

In some embodiments of a fuel cell humidifier for humidifying gas supplied to a fuel cell stack, the humidifier comprises a catalyst for promoting formation of hydrogen peroxide from hydrogen and oxygen within the humidifier. In some embodiments, the humidifier can have a dry-side compartment and a wet-side compartment. In some embodiments, the dry-side compartment and the wet-side compartment are separated by a water transfer membrane. In some embodiments, the catalyst can be a palladium-based catalyst. In some embodiments, the catalyst is located on both the wet-side compartment and the dry-side compartment of the humidifier. In some embodiments, the catalyst is deposited on a gas transport layer positioned adjacent the water transfer membrane on the wet-side compartment and/or on the dry-side compartment of the humidifier.

In some embodiments of a fuel cell humidifier for humidifying gas supplied to a fuel cell stack, the humidifier comprises an acidic gas transport layer positioned adjacent at least one side of the water transfer membrane. In some embodiments, the humidifier can have a dry-side compartment and a wet-side compartment. In some embodiments, the dry-side compartment and the wet-side compartment are separated by a water transfer membrane. In some embodiments, the water transfer membrane material is sandwiched between a pair of acidic gas transport layers.

In some of the above-described embodiments the water transfer membrane can be, for example, a water vapor transport membrane.

DETAILED DESCRIPTION OF ILLUSTRATIVE EMBODIMENT(S)

Figure 1:
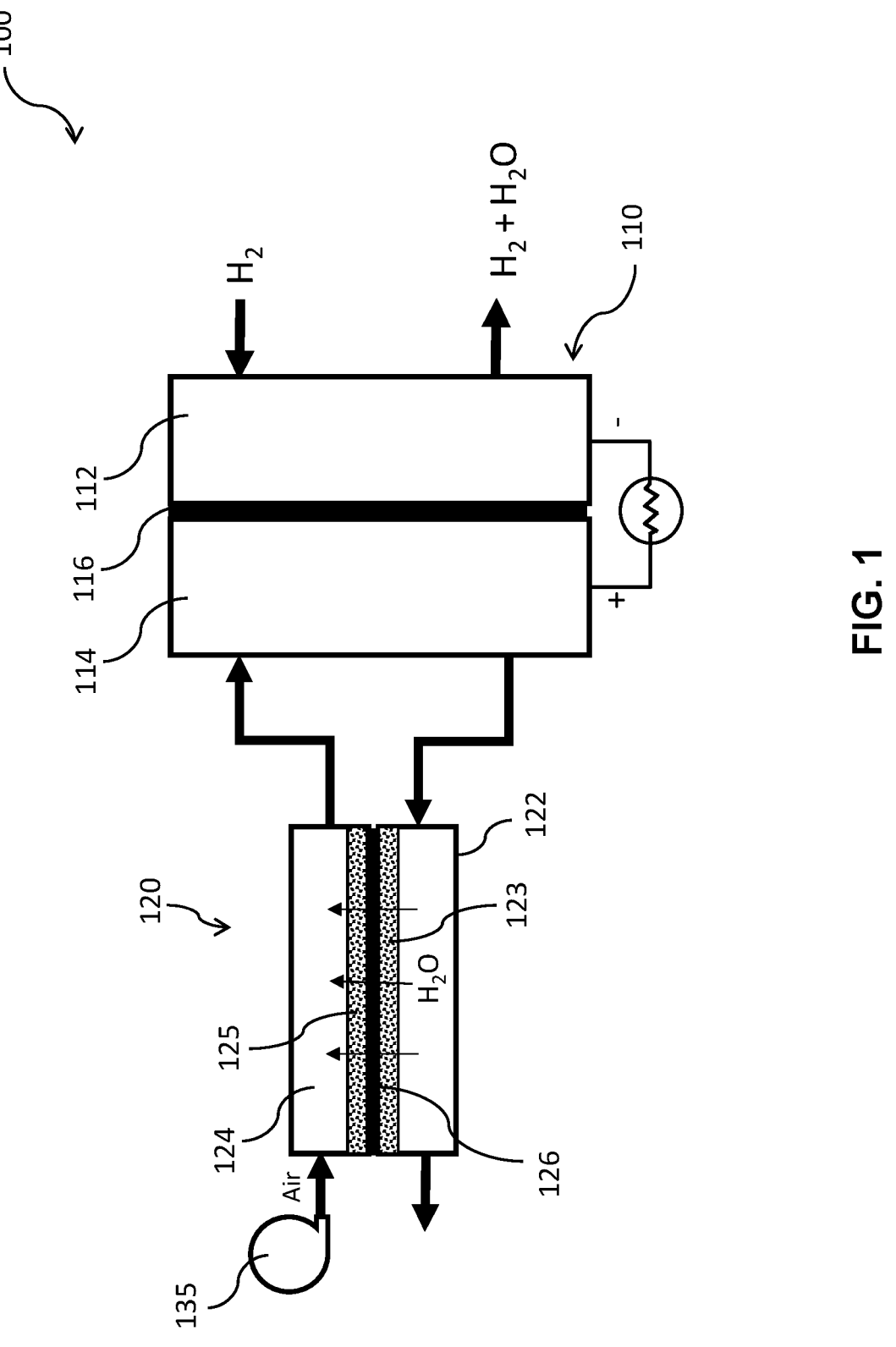
FIG. 1 is a schematic diagram showing a PEM fuel cell stack and a membrane-based humidifier configured so that the oxidant exhaust stream from the fuel cell stack is used to humidify the incoming oxidant stream.

In embodiments of the technology described herein various methods and apparatus are used to reduce the tendency for mold formation or accumulation in membrane-based humidifiers used for humidification of fuel cell reactant streams. The methods and apparatus described herein can be used individually or in various combinations.

A first approach is to eliminate oxygen or reduce the oxygen concentration to sufficiently low levels in a fuel cell humidifier when the humidifier is not in use (e.g. during an OFF state) that mold growth is inhibited or prevented.

A second approach involves promoting the in situ generation of hydrogen peroxide within a fuel cell humidifier.

A third approach involves the incorporation of acidic gas transport layers, for example, adjacent to the membrane in a fuel cell humidifier.

Each of these approaches is described in further detail below.

In many PEM fuel cell systems, fuel cell humidifiers serve the purpose of humidifying and heating the oxidant supplied to a fuel cell stack (e.g. the air inlet stream) through recovery of heat and humidity from the oxidant exhaust stream (e.g. air outlet stream). In some embodiments, this is accomplished by flowing the oxidant inlet stream and oxidant exhaust streams on opposite sides of a water transfer membrane in the humidifier. Such fuel cell humidifiers generally operate passively, have no moving parts, and rely on the relative humidity of the streams and temperature gradients to drive the net transfer of heat and water vapor from one stream to the other. In some embodiments, the cathode exhaust stream (warm, wet side) can saturate the membrane, and the dry oxidant inlet stream sets up a humidity gradient that facilitates the transfer of moisture from the exhaust stream into the inlet stream. In some embodiments, the water transfer membrane is hygroscopic, and the net water vapor transfer rate is dependent on the water concentration gradient, among other things. Overall, there can be a number of rates to consider in the humidifier, including, but not limited to:

(i) the rate of transport of water vapor from the wet water transfer membrane to the dry oxidant inlet stream;

(ii) the rate of internal transfer of water through the bulk water transfer membrane from the wet side to the dry side membrane-gas interface; and/or (iii) the rate of water uptake into the water transfer membrane from the moist oxidant exhaust stream on the wet side.

The term "water transfer membrane" as used herein, includes water vapor transport (WVT) membranes or materials, water permeable membranes or materials, and other porous or non-porous membranes or materials that under suitable conditions can allow water molecules to pass through them from a first fluid stream to a second fluid stream to increase the humidity or water vapor concentration of the second fluid stream.

Polymer chemistry and morphology can have a significant influence on water transfer rates through water transfer membranes, with ultra-thin PFSA polymers generally achieving the highest water transfer rates, mainly due to the acidity of the polymer driving the water uptake rate through solvation. Generally, non-acidic polymers have lower water transfer rates, as their chemical functional groups tend to have a lower solvation. For reference, solvation differs from solubility; solvation is measured as an adsorption rate (mol/s), whereas solubility describes an equilibrium concentration (mol/L) of maximum saturation prior to precipitation. When it comes to water transfer membranes, in some embodiments both aspects can be important, as solubility relates to the water content and solvation relates to the rate of internal transfer and absorption, up to the solubility maximum. Non-acidic hygroscopic polymers include, but are not limited to, for example, nylon, acrylonitrile butadiene styrenes (ABS), acrylics, polyethylene terephthalates (PET), polybutylene terephthalates (PBT), polyurethanes, polycarbonates. These materials can absorb moisture and release moisture into the air.

FIG. 1 is a schematic diagram showing fuel cell system 100, including fuel cell stack 110 and humidifier 120, in which the moist oxidant stream exiting the fuel cell stack is used to heat and humidify the inlet oxidant stream being delivered to fuel cell stack 110. Fuel cell stack 110 has anode compartment 112 supplied with fuel, such as hydrogen as indicated, and cathode compartment 114 supplied with air by an air delivery device 135 (such as a compressor, pump, or blower, for example) via humidifier 120. In some embodiments, the fuel cell stack has membrane electrode assembly 116 (typically comprising a membrane electrolyte having an electrocatalyst and optionally a gas diffusion layer on each side) separating the anode and cathode compartments. In at least some embodiments, fuel cell stack 110 includes other components not illustrated in FIG. 1, such as end-plates, seals, etc. In at least some embodiments, humidifier 120 has wet side 122 and dry side 124 separated by water transfer membrane 126. In the example shown in FIG. 1, there are porous gas transport layers 123 and 125 adjacent to water transfer membrane 126 on wet side 122 and dry side 124, respectively. In at least some embodiments, in operation a cool, dry incoming air stream is directed through the dry side 124 of humidifier 120 and into fuel cell stack 110. The exhaust stream from cathode compartment 114 is directed through wet side 122 of humidifier 120, and moisture and heat are transferred to the incoming air stream via water transfer membrane 126.

In FIG. 1, humidifier is shown schematically with a compartment on each side of water transfer membrane. In at least some embodiments, the humidifier is a multi-layer, plate-and-frame type of assembly with multiple layers of membrane separating the wet side from the dry side. Other structures are possible for the humidifier, and the apparatus and methods described herein can be implemented in various designs of humidifiers.

Similarly in FIG. 1, the fuel cell stack is shown schematically with an anode/fuel compartment on one side of the membrane electrolyte and a cathode/oxidant compartment on the other side of the membrane electrolyte, but is intended to represent a fuel cell stack which can include multiple fuel cell assemblies stacked between a pair of end plates, for example.

Reduction or Elimination of Oxygen in the Humidifier when not in Use

In many applications, PEM fuel cell systems do not operate continuously. Generally there are OFF periods during normal use over the lifetime of the fuel cell system, in many cases daily or even more frequently.

One approach to reduce or prevent mold growth and/or accumulation in fuel cell humidifiers involves controlling the environment (e.g. gas composition) inside the humidifier during an OFF state (when is it not being used). In some embodiments, this approach can involve reducing the oxygen concentration in the humidifier to stifle the growth of mold, for example, by providing a hydrogen-rich environment inside the humidifier during OFF states of a fuel cell system.

In some embodiments of fuel cell systems, isolation valves can be positioned between the humidifier and the fuel cell stack on the stack oxidant inlet side, and between fuel cell stack and the humidifier on the stack oxidant outlet side. In some embodiments, upon shutdown of the system, the isolation valves are closed and within the fuel cell stack hydrogen is allowed to permeate through the membrane electrolyte from the anode compartment(s) into the cathode compartment(s) where oxygen will be consumed, by reaction with the hydrogen, until there is a substantially oxygen-free (anaerobic) environment within fuel cell stack (at least for a period of time, for example until air from the surrounding enters the fuel cell stack via the seals etc.). In at least some embodiments, this arrangement, however, oxygen can remain present in the fuel cell humidifier while the fuel cell system is in an OFF state. The atmosphere inside the fuel cell humidifier can contain one or more types of airborne bacteria that may fall into three general classes: (a) obligate aerobes, (b) obligate anaerobes, and (c) facultative anaerobes. Aerobic and anaerobic bacteria can account for much of airborne bacteria, with facultative bacteria being less common. Having oxygen present in the humidifier when it is not operating can lead to mold growth that is most commonly aerobic in nature.

Figure 2A:
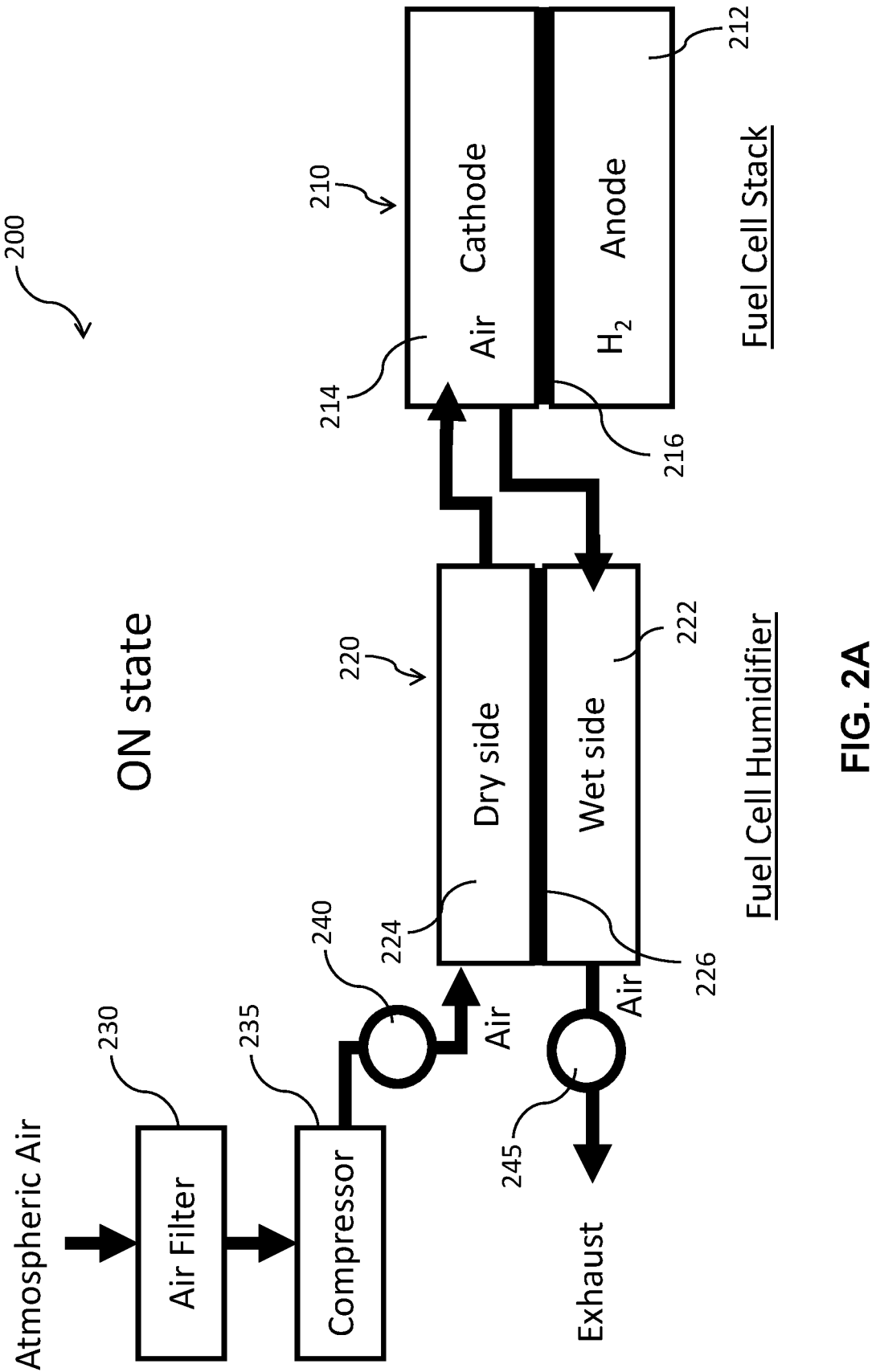
FIG. 2A is a schematic diagram showing an embodiment of a fuel cell system, including a fuel cell stack and a humidifier, in an ON state.
Figure 2B:
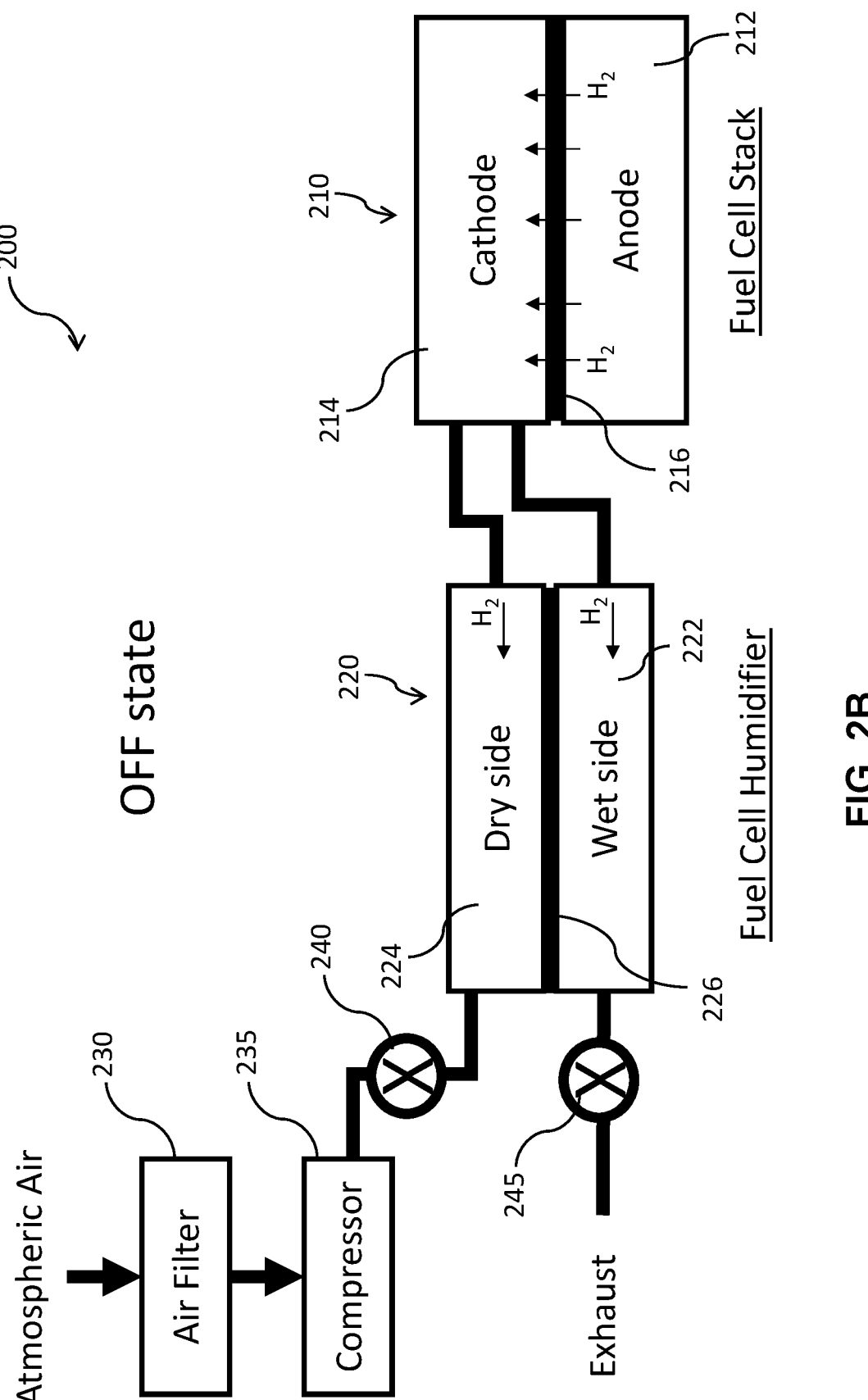
FIG. 2B is a schematic diagram showing the fuel cell system of FIG. 2A in an OFF state.

FIGS. 2A and 2B are schematic diagrams showing fuel cell system 200 in an ON state and in an OFF state, respectively. An ON state can include when fuel cell system 200 is in an electrical-power producing mode of operation, for example. An OFF state can include when fuel cell system 200 is in a shutdown mode, for example. Fuel cell system 200 includes a fuel cell stack 210 and humidifier 220. Fuel cell stack 210 has anode compartment 212 (supplied with fuel via a fuel supply and optional recirculation system—not shown in FIGS. 2A and 2B), a cathode compartment 214 (supplied with air as shown), and fuel cell membrane electrolyte 216 separating the anode and cathode compartments. In some embodiments, fuel cell stack 210 includes other components not illustrated in FIGS. 2A and 2B, such as electrocatalyst, gas diffusion layers, end-plates, seals, etc. For example, fuel cell membrane electrolyte 216 can be part of a membrane electrode assembly (MEA) which separates the anode and cathode compartments and, in some embodiments, comprises an electrocatalyst and optionally a gas diffusion layer on each side of the membrane electrolyte. In at least some embodiments, humidifier 220 has wet side 222 and dry side 224 separated by water transfer membrane 226. In some embodiments, in an ON state (for example, as shown in FIG. 2A), humidifier 220 contains oxygen (e.g. in the air) on both the wet side 222 and dry side 224 of water transfer membrane 226, as it passively transfers moisture from the oxidant exhaust stream from fuel cell stack 210 to humidify the oxidant inlet stream supplied to fuel cell stack 210 via incoming air filter 230 and compressor 235. In some embodiments, in fuel cell system 200, inlet isolation valve 240 is positioned between compressor 235 and humidifier 220 (on the oxidant inlet side, upstream of both humidifier 220 and fuel cell stack 210), and outlet isolation valve 245 is positioned downstream of humidifier 220 on the oxidant outlet side. In some embodiments, when fuel cell system 200 is in an ON state, valves 240 and 245 are open. In some embodiments, when fuel cell system 200 moves into an OFF state, valves 240 and 245 are closed, for example, as shown in FIG. 2B. In this state, hydrogen is allowed to permeate through fuel cell membrane electrolyte 216 into cathode compartment 214 (as indicated by the small arrows in FIG. 2B), where oxygen can be consumed, for example, until there is a substantially oxygen-free (anaerobic) environment within fuel cell stack 210.

In at least some embodiments, with valves 240 and 245 located as shown in FIGS. 2A and 2B, fuel cell humidifier 220 can also experience an anaerobic environment (or at least an oxygen-depleted environment) after shutdown as hydrogen can diffuse from cathode compartment 214 of fuel cell stack 210 into both sides (222 and 224) of humidifier 220 (as indicated by the small arrows in FIG. 2B). In at least some embodiments, humidifier 220 and fuel cell stack 210 are thus effectively passivated with hydrogen when in an OFF state. For example, in some embodiments the concentration of oxygen in humidifier is reduced to a sufficiently low level that mold growth inside the humidifier is inhibited or prevented. In some embodiments, when fuel cell system 200 moves into an OFF state, valve 240 is closed to stop the supply of air, and then the supply of hydrogen to fuel cell stack 210 is interrupted.

Thus, by positioning the valves and operating them as described in reference to FIGS. 2A and 2B it is possible to create an anaerobic environment within humidifier 220, as well as within fuel cell stack 210. In at least some embodiments, humidifier 220 and fuel cell stack 210 can thus be effectively passivated with hydrogen when in an OFF state. In at least some embodiments, this tends to limit the growth of aerobic bacteria within the humidifier and/or causes them to die off, thereby arresting their accumulation within the humidifier. Thus, in at least some embodiments, cycling to an anaerobic, hydrogen-rich environment within the fuel cell humidifier during shutdown (and optionally sustaining such an environment until the fuel cell system is turned on again) can be used to prolong the lifetime of membrane-based fuel cell humidifiers.

Figure 3A:
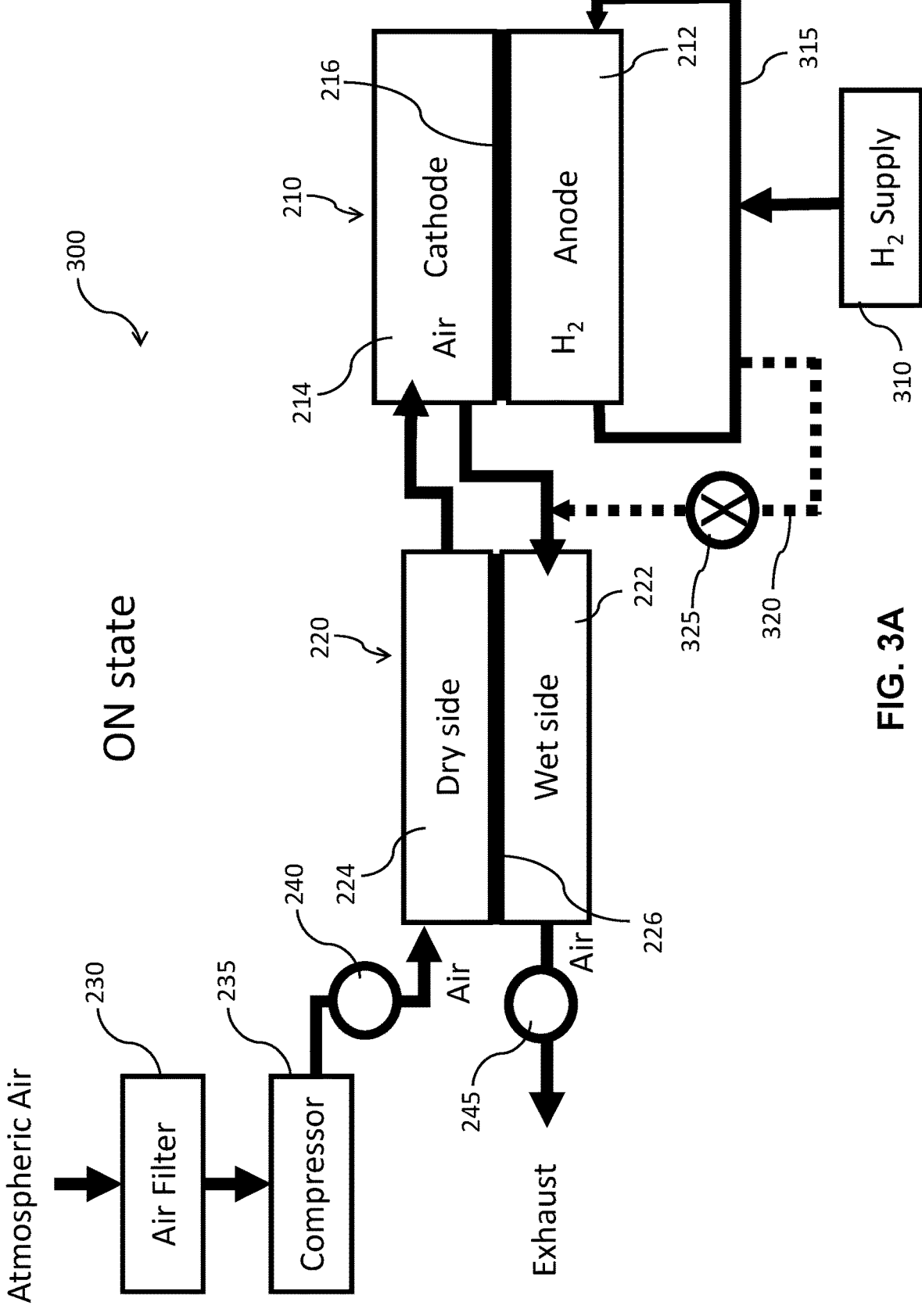
FIG. 3A is a schematic diagram showing another embodiment of a fuel cell system, including a fuel cell stack and a humidifier, in an ON state.
Figure 3B:
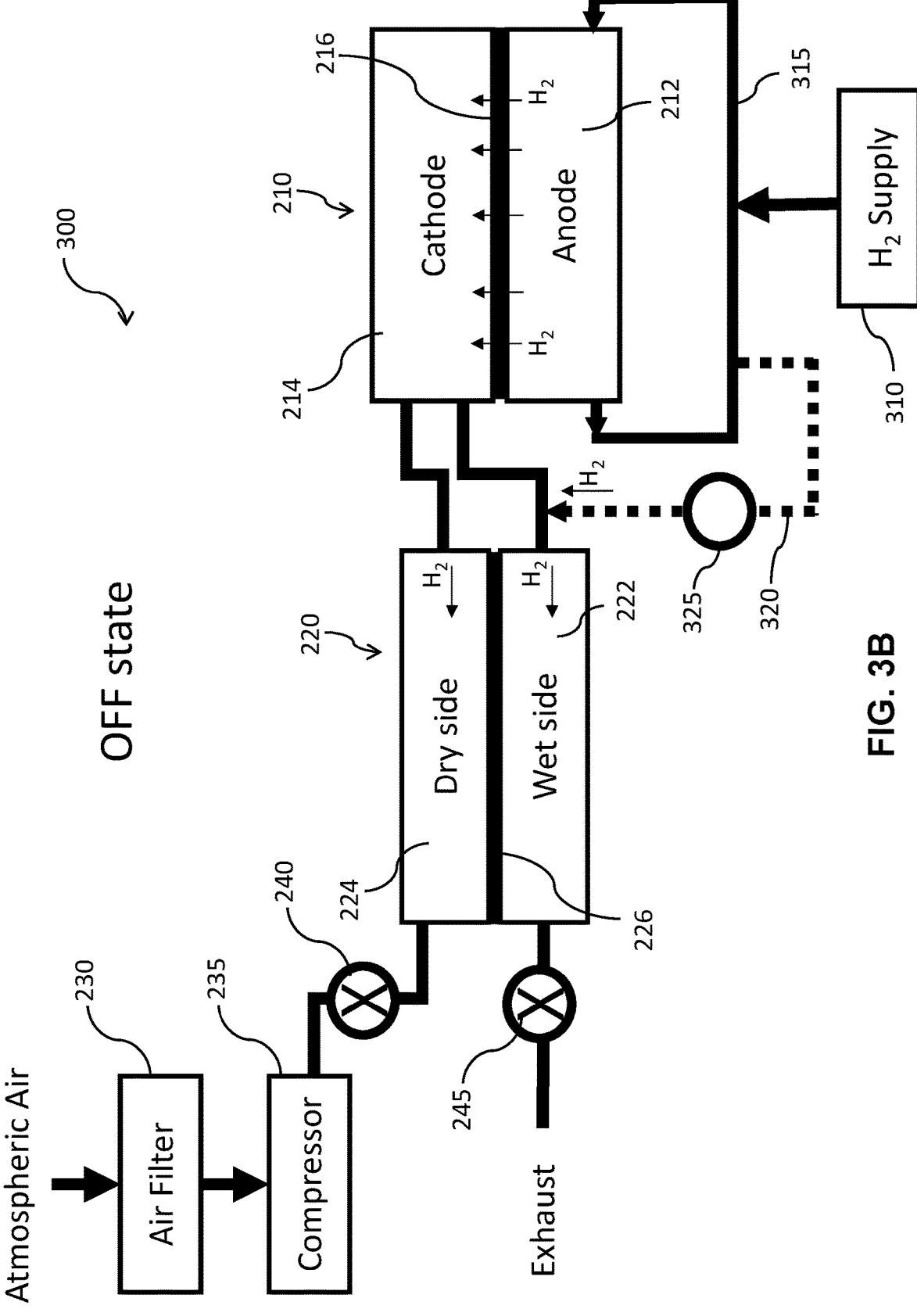
FIG. 3B is a schematic diagram showing the fuel cell system of FIG. 3A in an OFF state.

FIGS. 3A and 3B are schematic diagrams showing fuel cell system 300 in an ON state and in an OFF state, respectively. An ON state can include when fuel cell system 300 is in an electrical-power producing mode of operation, for example. An OFF state can include when fuel cell system 300 is in a shutdown mode, for example. Fuel cell system 300 is similar to fuel cell system 200 of FIGS. 2A and 2B. The same reference numerals are used to describe components common to both systems, and, in at least some embodiments, the description provided above in relation to fuel cell system 200 can be applied to fuel cell system 300. In some embodiments, fuel cell system 300 further comprises hydrogen supply 310, fuel recirculation loop 315, bleed line 320, and purge valve 325. As shown in FIG. 3A, in an ON state, hydrogen from hydrogen supply 310 is circulated through anode compartment 212 of fuel cell stack 210 anode via a fuel recirculation loop 315. In at least some embodiments, hydrogen supply 310 can comprise a valve, regulator, or other mechanism (not shown) for controlling the supply of hydrogen to fuel recirculation loop 315. In at least some embodiments, during operation of fuel cell system 300 in an ON state, fuel recirculation loop 315 can be purged from time to time (for example, when inert gases, water or impurities accumulate in the loop) by opening purge valve 325 in bleed line 320 and allowing a small volume of gas from fuel recirculation loop 315 to be released into the fuel cell cathode exhaust stream.

In at least some embodiments, when fuel cell system 300 moves into an OFF state, valves 240 and 245 are closed (as shown in FIG. 3B) and hydrogen can permeate through fuel cell membrane electrolyte 216 into cathode compartment 214, and diffuse from cathode compartment 214 of fuel cell stack 210 into both sides (222 and 224) of humidifier 220 as described above in reference to fuel cell system 200. In addition, in at least some embodiments, purge valve 325 in bleed line 320 can be opened to allow some hydrogen from fuel recirculation loop 315 to enter wet side 222 of humidifier 220 more directly, without having to first diffuse through fuel cell membrane electrolyte 216. Supply of hydrogen from hydrogen supply 310 can be stopped during the OFF state, or hydrogen can continue to be supplied to fuel recirculation loop 315 (with or without purge valve 325 open) intermittently or continuously during the OFF state, to help maintain a hydrogen-rich environment within humidifier 220. In some embodiments, during an OFF state, anode compartment 212 can be maintained at an above ambient pressure (and at a higher pressure than cathode compartment 214).

Figure 4A:
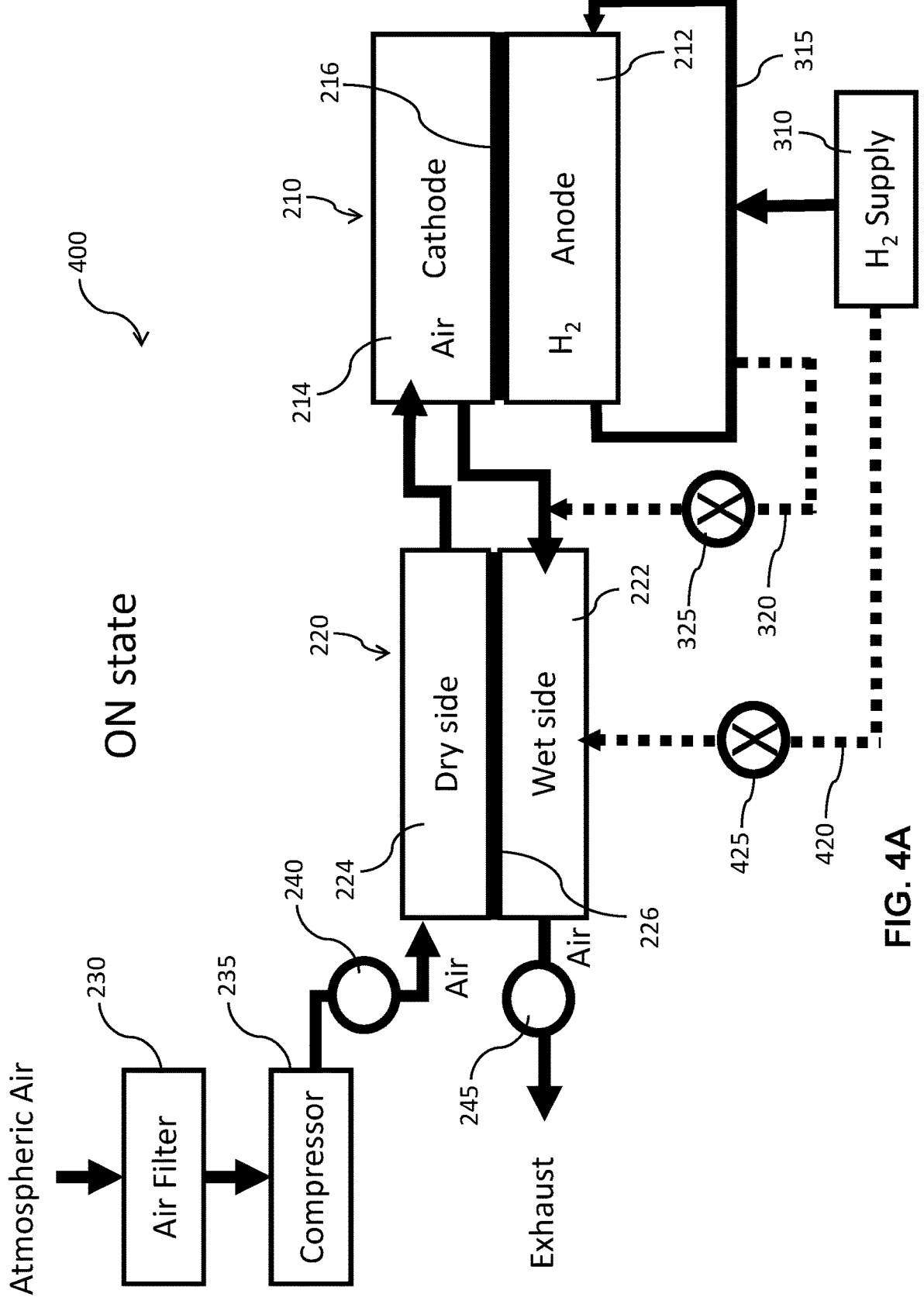
FIG. 4A is a schematic diagram showing another embodiment of a fuel cell system, including a fuel cell stack and a humidifier, in an ON state.
Figure 4B:
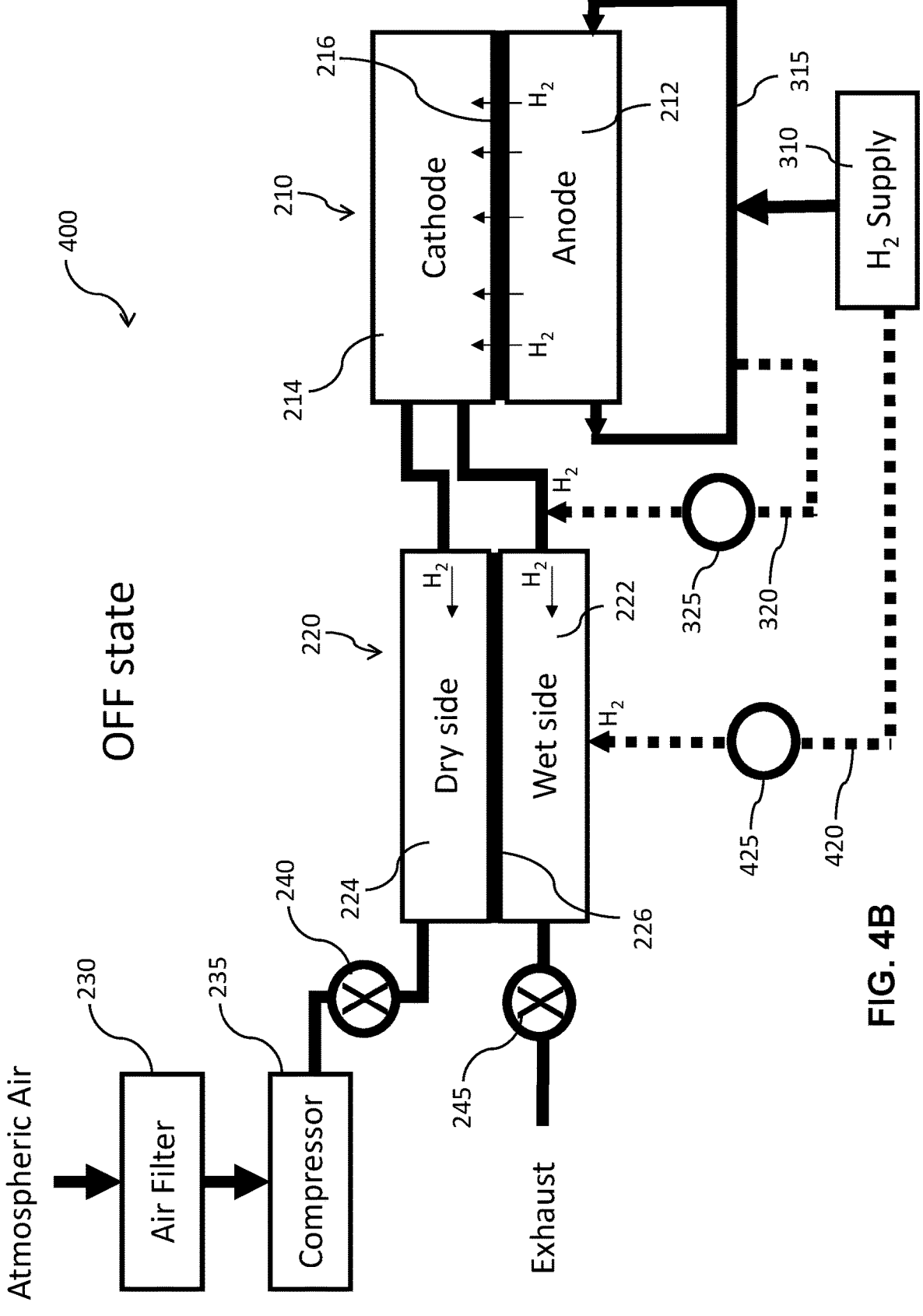
FIG. 4B is a schematic diagram showing the fuel cell system of FIG. 4A in an OFF state.

FIG. 4A and FIG. 4B are schematic diagrams showing fuel cell system 400 in an ON state and in an OFF state, respectively. An ON state can include when fuel cell system 400 is in an electrical-power producing mode of operation, for example. An OFF state can include when fuel cell system 400 is in a shutdown mode, for example. Fuel cell system 400 is similar to fuel cell system 300 of FIGS. 3A and 3B. The same reference numerals are used to describe components common to both systems, and, in at least some embodiments, description above provided in reference to fuel cell system 300 can be applied to fuel cell system 400. In some embodiments, fuel cell system 400 further comprises bypass line 420 and bypass valve 425. As shown in FIG. 4A, in an ON state, hydrogen from hydrogen supply 310 is circulated through anode compartment 212 of fuel cell stack 210 anode via fuel recirculation loop 315. In at least some embodiments, fuel recirculation loop 315 can be purged from time to time by opening purge valve 325 in bleed line 320 as described in reference to fuel cell system 300 of FIG. 3A.

In at least some embodiments, when fuel cell system 400 moves into an OFF state, valves 240 and 245 are closed (as shown in FIG. 4B) and hydrogen can permeate through fuel cell membrane electrolyte 216 into cathode compartment 214, and diffuse from cathode compartment 214 of fuel cell stack 210 into both sides (222 and 224) of humidifier 220 as described above in reference to fuel cell system 300. In addition, in at least some embodiments, purge valve 325 in bleed line 320 can be opened to allow some hydrogen from fuel recirculation loop 315 to enter wet side 222 of humidifier 220 more directly, without having to first diffuse through fuel cell membrane electrolyte 216, as described above in reference to fuel cell system 300. Furthermore, in at least some embodiments, hydrogen can be supplied directly from hydrogen supply 310 to the wet side 222 (and/or the dry side 224) of humidifier 220 by opening bypass valve 425 in bypass line 420 (as shown in FIG. 4B—either intermittently or continuously during the OFF state) to help achieve and maintain a hydrogen-rich environment within humidifier 220.

Again in FIGS. 2A, 2B, 3A, 3B, 4A and 4B, fuel cell stack 210 and humidifier 220 are shown schematically, and are intended to represent any of a variety of suitable structures.

In Situ $H_2O_2$ Generation from Hydrogen/Oxygen Reactions

Another option to arrest bacteria growth within a fuel cell humidifier is through the use of hydrogen peroxide ($H_2O_2$). The direct synthesis of $H_2O_2$ can be achieved through mixing of hydrogen and oxygen gases over a suitable selective catalyst. The choice of catalyst can be important, so that $H_2O_2$ is generated rather than water. In fuel cell chemistry, typical platinum-based catalysts used in fuel cells generally lead to a four-electron reduction of oxygen with hydrogen to produce water. However, if a different catalyst is employed, such as a palladium-based catalyst, the reaction can be limited to a two-electron transfer, and result in preferential synthesis of $H_2O_2$. Hydrogen and oxygen concentrations play a significant role in the synthesis of $H_2O_2$. For example, with an equimolar or greater concentration of oxygen, the reaction favors the formation of $H_2O_2$, as shown in Equation (1):

$$O_2 + H_2 \rightarrow H_2O_2 \text{ when } [O_2] \geq [H_2] \qquad (1)$$

However, in a hydrogen-rich environment the reaction generally continues through a hydrogenation reaction to produce water, as shown in Equation (2):

$$H_2O_2 + H_2 \rightarrow 2H_2O \text{ when excess } H_2 \qquad (2)$$

Therefore, incorporating a catalyst into a humidifier that promotes the generation of $H_2O_2$, and allowing the slow diffusion of hydrogen into the humidifier, for example, from the anode side of a fuel cell stack when a fuel cell system is in an OFF-state (for example, as described in reference to FIGS. 2A and 2B above) can be used, at least in some embodiments, to generate $H_2O_2$ within the humidifier. The high oxygen to hydrogen concentration ratio that occurs early on during the passivation of the humidifier with hydrogen can produce $H_2O_2$, as shown in Equation (1).

Upon continued hydrogen diffusion into the humidifier, the environment inside the humidifier eventually becomes hydrogen-rich, and $H_2O_2$ that is generated can undergo further reaction with hydrogen to yield water, as shown in Equation (2). Simultaneously, $H_2O_2$ can decompose into water and a half equivalent of oxygen, as shown in Equation (3).

$$H_2O_2 \rightarrow H_2O + \tfrac{1}{2}O_2 \text{ when excess } H_2 \qquad (3)$$

In some embodiments. the oxygen can then be reduced to $H_2O_2$ as shown in Equation (1), resulting in further decomposition or hydrogenation through the reactions shown in Equations (2) and/or (3), until most of, if not all of, the oxygen in the humidifier is consumed.

In at least some embodiments, this approach generates a finite amount of $H_2O_2$ (based on the initial molar amount of oxygen in the humidifier and surrounding piping), and provides a window of opportunity for $H_2O_2$ generated in-situ inside the humidifier to react with harmful organic compounds and/or bacteria to reduce the tendency for mold formation and accumulation. In at least some embodiments this can improve the performance and prolong the life of the humidifier. Due to the difference in duration between shutdown to a hydrogen-rich environment in the cathode loop (diffusion-controlled) and the re-establishment of an oxygen-rich environment upon flowing air into the humidifier from the compressor via the fuel cell stack at start-up (convection-controlled), the in-situ generated hydrogen peroxide can arrest bacteria growth while not requiring injection of cleaning agents or disassembly of the humidifier for cleaning.

Catalysts that promote generation of hydrogen peroxide can do so by limiting the homolytic bond cleavage reaction that is generally promoted by platinum-based catalysts. Examples of oxygen-reduction catalysts that can promote generation of hydrogen peroxide include bimetallic palladium-based catalysts (e.g. PdAu, PdSn, PdZn) and anthraquinone/Pd catalysts, and also some platinum-based catalysts. In at least some embodiments, catalysts that promote generation of hydrogen peroxide can be incorporated into a humidifier (such as a fuel cell humidifier). In at least some embodiments, such catalysts can be used as a coating or as a dopant on porous gas transport layers in the humidifier (for example, a porous gas transport layers 123 and 125 shown in humidifier 120 of FIG. 1). In at least some embodiments, the gas transport layers can also be rendered resistant to mold formation as described below. In some embodiments, the catalyst can be doped into the fibers of a gas transport layer, and/or the gas transport layer can be coated with catalyst-containing coating through dip coating, spray coating and like. In some embodiments, coating can be done during the fiber-making process and/or by coating the finished mat material. Alternatively, or as well, catalysts can be incorporated within the water transfer membrane or in a coating on the membrane, or can be incorporated on the inside of the housing, and/or on other components inside the humidifier.

In some embodiments, catalysts that promote 4-electron transfer reduction reactions of hydrogen and oxygen to water promote the homolytic cleavage of oxygen into radical species, *O and/or *OH, which are also strong oxidizing agents.

Acidic Gas Transport Layers

Porous gas transport layers in membrane-based humidifiers can be used to provide mechanical support for thin film water transfer membranes, while simultaneously acting as diffusion media to facilitate the delivery of gas (e.g. dry and/or moist air) to the surface of the water transfer membrane. In at least some embodiments, porous gas transport layers can be made from a porous electrically conductive or electrically non-conductive material such as glass fiber mat or cloth, polymeric mat, or cloth (e.g. where the polymer is a polycarbonate, a polyamide, or a polyolefin, etc.), or carbon fiber paper or cloth, for example.

In at least some embodiments, when using a humidifier employing one or more porous gas transport layers, having an acidic surface on the gas transport layer can help to inhibit bacterial growth particularly if the humidifier uses a non-acidic water transfer membrane. For example, an acidic surface treatment can be applied to a porous gas transport layer to render it acidic. In at least some embodiments, an acidic gas transport layer can offer other advantages, for example, even when used in combination with an acidic water transfer membrane or a non-acidic water transfer membrane, it can reduce formation of mold on the gas transport layer. Also, an acidic gas transport layer can act as a secondary filter (downstream of the intake air filter) to further protect the membrane electrolyte in the fuel cell stack from breakthrough ionic and alkaline compounds. In some embodiments, an acidic gas transport layer can be used on both wet and dry side of the humidifier to inhibit bacterial growth in the humidifier. For example, one method to provide an acidic surface on a gas transport layer includes coating the surface of the material with a non-water-soluble polymer containing acidic functional groups, such as polymers containing sulfonic acid, and/or carboxylic acids.

The approaches described herein can be used individually and/or in various combinations to reduce the tendency for mold formation and accumulation in membrane-based humidifiers used in PEM fuel cell systems. can include reducing the oxygen concentration and/or generating hydrogen peroxide within the humidifier upon shutdown of a fuel cell system. For example, techniques to reduce the oxygen concentration in a fuel cell humidifier when the humidifier is not in use (e.g. during an OFF state) can be used in combination with the use of acidic gas transport layers in a fuel cell humidifier, and/or in combination using a catalyst to promote the generation of hydrogen peroxide from hydrogen and oxygen in a fuel cell humidifier.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of operating a fuel cell system, said fuel cell system comprising:

a humidifier having a dry-side compartment and a wet-side compartment, said dry-side compartment separated from said wet-side compartment by a water transfer membrane; and a fuel cell stack comprising an anode compartment and a cathode compartment, said anode compartment separated from said cathode compartment by a proton-exchange membrane;

wherein, in an electrical power-producing mode of operation, said method comprises:

supplying hydrogen to said anode compartment of said fuel cell stack;

supplying air to said cathode compartment of said fuel cell stack via said dry-side compartment of said humidifier;

discharging oxygen-depleted air from said cathode compartment of said fuel cell stack, and directing it through said wet-side compartment of said humidifier, whereby said air supplied to said cathode compartment of said fuel cell stack is humidified by said oxygen-depleted air discharged from said cathode compartment of said fuel cell stack; and drawing electrical power from said fuel cell stack; and wherein, in a shutdown mode, said method comprises:

interrupting supplying hydrogen to said anode compartment of said fuel cell stack;

interrupting supplying air to said cathode compartment of said fuel cell stack; and allowing hydrogen to diffuse from said anode compartment to said cathode compartment of said fuel cell stack via said proton-exchange membrane, and from said cathode compartment of said fuel cell stack to said dry-side compartment of said humidifier and to said wet-side compartment of said humidifier, whereby at least a portion of said diffused hydrogen reacts to consume oxygen in said cathode compartment of said fuel cell stack, wherein said supplying hydrogen to said anode compartment of said fuel cell stack comprises supplying hydrogen to said anode compartment of said fuel cell stack from a hydrogen supply via a fuel recirculation loop, wherein, in said shutdown mode, said method comprises providing hydrogen from a fuel supply to at least one of said dry-side compartment or said wet-side compartment of said humidifier, wherein said hydrogen is supplied from said fuel supply to at least one of said dry-side compartment or said wet-side compartment of said humidifier via a line that bypasses said fuel cell stack.

2. The method of claim 1 wherein interrupting supplying air to said cathode compartment of said fuel cell stack comprises closing a first valve positioned upstream of said dry-side compartment of said humidifier.

3. The method of claim 1 wherein allowing hydrogen to diffuse from said anode compartment to said cathode compartment of said fuel cell stack via said proton-exchange membrane, and from said cathode compartment of said fuel cell stack to said dry-side compartment and to said wet-side compartment of said humidifier, comprises closing a second valve positioned downstream of said wet-side compartment of said humidifier.

4. The method of claim 1 wherein at least one of said dry-side compartment or said wet-side compartment of said humidifier comprises a catalyst for promoting formation of hydrogen peroxide from oxygen and hydrogen during said shutdown mode.

5. The method of claim 1 wherein at least a second portion of said diffused hydrogen reacts to consume oxygen in said dry-side compartment and said wet-side compartment of said humidifier.

6. The method of claim 1 wherein said interrupting supplying air to said cathode compartment of said fuel cell stack is performed prior to said interrupting supplying hydrogen to said anode compartment of said fuel cell stack.

7. The method of claim 1 wherein, in said shutdown mode, said method comprises providing a fluid connection between said fuel recirculation loop and at least one of said dry-side compartment or said wet-side compartment of said humidifier.

8. The method of claim 7 wherein providing said fluid connection between said fuel recirculation loop and at least one of said dry-side compartment or said wet-side compartment of said humidifier comprises opening a valve between said fuel recirculation loop and said humidifier.

9. A fuel cell system comprising:

a fuel cell stack;

an oxidant supply device for supplying air to said fuel cell stack;

a humidifier for humidifying air supplied by said oxidant supply device to said fuel cell stack, said humidifier having a dry-side compartment and a wet-side compartment, wherein said dry-side compartment and said wet-side compartment are separated by a water transfer membrane;

a first air supply line between said oxidant supply device and said dry-side compartment of said humidifier;

a second air supply line between said dry-side compartment of said humidifier and an oxidant inlet of said fuel cell stack, for directing humidified air from said humidifier to said fuel cell stack;

a first exhaust line connected between an oxidant outlet of said fuel cell stack and said wet-side compartment of said humidifier, for supplying an oxidant exhaust gas discharged from said fuel cell stack to said wet-side compartment of said humidifier to humidify air supplied by said oxidant supply device to said fuel cell stack;

a second exhaust line for discharging an exhaust stream from said wet-side compartment of said humidifier;

a first valve installed in said first air supply line, wherein said first valve is for selectively opening and closing said first air supply line; and a second valve installed in said second exhaust line wherein said second valve is for selectively opening and closing said second exhaust line, wherein said humidifier comprises an acidic gas transport layer positioned adjacent at least one side of said water transfer membrane.

10. The fuel cell system of claim 9 wherein said humidifier comprises a catalyst for promoting formation of hydrogen peroxide from hydrogen and oxygen.

11. The fuel cell system of claim 10 wherein said catalyst is located on both said wet-side compartment and said dry-side compartment of said humidifier.

12. The fuel cell system of claim 10 wherein said catalyst is deposited on a gas transport layer positioned adjacent said water transfer membrane on said wet-side compartment and/or on said dry-side compartment of said humidifier.

13. A fuel cell system comprising:

a fuel cell stack;

an oxidant supply device for supplying air to said fuel cell stack;

a humidifier for humidifying air supplied by said oxidant supply device to said fuel cell stack, said humidifier having a dry-side compartment and a wet-side compartment, wherein said dry-side compartment and said wet-side compartment are separated by a water transfer membrane;

a first air supply line between said oxidant supply device and said dry-side compartment of said humidifier;

a second air supply line between said dry-side compartment of said humidifier and an oxidant inlet of said fuel cell stack, for directing humidified air from said humidifier to said fuel cell stack;

a first exhaust line connected between an oxidant outlet of said fuel cell stack and said wet-side compartment of said humidifier, for supplying an oxidant exhaust gas discharged from said fuel cell stack to said wet-side compartment of said humidifier to humidify air supplied by said oxidant supply device to said fuel cell stack;

a second exhaust line for discharging an exhaust stream from said wet-side compartment of said humidifier;

a first valve installed in said first air supply line, wherein said first valve is for selectively opening and closing said first air supply line; and a second valve installed in said second exhaust line wherein said second valve is for selectively opening and closing said second exhaust line;

a fuel supply device and a fuel recirculation loop for circulating a fuel through said fuel cell stack; and a fuel bleed line fluidly connecting said fuel recirculation loop to said first exhaust line, said fuel bleed line comprising a purge valve for selectively bleeding fuel from said fuel recirculation loop into said wet-side compartment of said humidifier via said first exhaust line.

14. The fuel cell system of claim 13 wherein said humidifier comprises a catalyst for promoting formation of hydrogen peroxide from hydrogen and oxygen.

15. The fuel cell system of claim 14 wherein said catalyst is located on both said wet-side compartment and said dry-side compartment of said humidifier.

16. The fuel cell system of claim 14 wherein said catalyst is deposited on a gas transport layer positioned adjacent said water transfer membrane on said wet-side compartment and/or on said dry-side compartment of said humidifier.

17. A fuel cell system comprising:

a fuel cell stack;

an oxidant supply device for supplying air to said fuel cell stack;

a humidifier for humidifying air supplied by said oxidant supply device to said fuel cell stack, said humidifier having a dry-side compartment and a wet-side compartment, wherein said dry-side compartment and said wet-side compartment are separated by a water transfer membrane;

a first air supply line between said oxidant supply device and said dry-side compartment of said humidifier;

a second air supply line between said dry-side compartment of said humidifier and an oxidant inlet of said fuel cell stack, for directing humidified air from said humidifier to said fuel cell stack;

a first exhaust line connected between an oxidant outlet of said fuel cell stack and said wet-side compartment of said humidifier, for supplying an oxidant exhaust gas discharged from said fuel cell stack to said wet-side compartment of said humidifier to humidify air supplied by said oxidant supply device to said fuel cell stack;

a second exhaust line for discharging an exhaust stream from said wet-side compartment of said humidifier;

a first valve installed in said first air supply line, wherein said first valve is for selectively opening and closing said first air supply line;

a second valve installed in said second exhaust line wherein said second valve is for selectively opening and closing said second exhaust line;

a fuel supply device and a fuel recirculation loop for circulating a fuel through said fuel cell stack; and a fuel bypass line fluidly connecting at least one of said wet-side compartment or said dry-side compartment of said humidifier to a fuel supply, said fuel bypass line comprising a valve for controlling supply of fuel from said fuel supply to said humidifier.

18. The fuel cell system of claim 17 wherein said humidifier comprises a catalyst for promoting formation of hydrogen peroxide from hydrogen and oxygen.

19. The fuel cell system of claim 18 wherein said catalyst is located on both said wet-side compartment and said dry-side compartment of said humidifier.

20. The fuel cell system of claim 18 wherein said catalyst is deposited on a gas transport layer positioned adjacent said water transfer membrane on said wet-side compartment and/or on said dry-side compartment of said humidifier.

* * * * *